United States Patent
Theisen et al.

(10) Patent No.: US 10,412,895 B2
(45) Date of Patent: Sep. 17, 2019

(54) MULTI-THRESH CONCAVE SECTION FOR ROTARY COMBINE

(71) Applicants: Andrew J. Theisen, Fond du Lac, WI (US); Neal J. Stoffel, Campbellsport, WI (US)

(72) Inventors: Andrew J. Theisen, Fond du Lac, WI (US); Neal J. Stoffel, Campbellsport, WI (US)

(73) Assignee: Kondex Corporation, Lomira, WI (US)

( * ) Notice: Subject to any disclaimer, the term of this patent is extended or adjusted under 35 U.S.C. 154(b) by 30 days.

(21) Appl. No.: 15/667,479

(22) Filed: Aug. 2, 2017

(65) Prior Publication Data
US 2019/0037773 A1   Feb. 7, 2019

(51) Int. Cl.
| A01F 12/26 | (2006.01) |
| A01F 7/06 | (2006.01) |
| A01F 12/18 | (2006.01) |
| A01F 12/28 | (2006.01) |
| A01F 12/44 | (2006.01) |
| A01F 12/46 | (2006.01) |

(52) U.S. Cl.
CPC ............ *A01F 12/26* (2013.01); *A01F 7/062* (2013.01); *A01F 12/185* (2013.01); *A01F 12/28* (2013.01); *A01F 12/44* (2013.01); *A01F 12/46* (2013.01)

(58) Field of Classification Search
CPC .......... A01F 12/26; A01F 12/28; A01F 7/062; A01F 12/185
See application file for complete search history.

(56) References Cited

U.S. PATENT DOCUMENTS

| 2,457,259 | A | * | 12/1948 | Moll | A01F 12/24 241/190 |
| 2,833,288 | A | * | 5/1958 | Scranton | A01F 12/185 241/89.2 |
| 3,568,682 | A | * | 3/1971 | Knapp | A01F 12/24 460/108 |
| RE31,860 | E | * | 4/1985 | Decoene | A01D 41/12 460/73 |
| 5,057,056 | A | * | 10/1991 | Kambeitz | A01F 12/24 460/110 |
| 5,489,239 | A | * | 2/1996 | Matousek | A01F 12/28 460/109 |
| 5,569,080 | A | * | 10/1996 | Estes | A01F 12/24 460/110 |
| 6,193,604 | B1 | | 2/2001 | Ramp et al. | |
| 6,358,142 | B1 | * | 3/2002 | Imel | A01F 12/26 460/107 |

(Continued)

FOREIGN PATENT DOCUMENTS

GB    2 015 855 A    9/1979

*Primary Examiner* — Arpad Fabian-Kovacs
(74) *Attorney, Agent, or Firm* — Reinhart Boerner Van Deuren P.C.

(57) ABSTRACT

The concave section includes a first concave body. The first concave body includes a first leading end, a first trailing end, a first upstream side and a first downstream side. A width between the first upstream side and the first downstream side is no greater than 10 inches. The first concave body includes a first crop engagement face that extends between the first ends and the first sides. The first crop engagement face includes at least one of a first thresher profile portion and a first separator profile portion.

24 Claims, 19 Drawing Sheets

(56) References Cited

U.S. PATENT DOCUMENTS

| | | | |
|---|---|---|---|
| 6,485,364 B1 * | 11/2002 | Gryspeerdt | A01D 41/1271 |
| | | | 460/107 |
| 6,530,833 B2 | 3/2003 | Imel et al. | |
| 6,537,148 B2 | 3/2003 | Schwersmann | |
| 7,749,055 B2 | 7/2010 | Ricketts | |
| D624,939 S | 10/2010 | Flickinger et al. | |
| 8,313,361 B2 | 11/2012 | Flickinger et al. | |
| 8,454,416 B1 | 6/2013 | Estes | |
| D687,659 S | 8/2013 | MacKenzie | |
| 8,690,652 B1 | 4/2014 | Estes | |
| 8,721,411 B2 | 5/2014 | Reiger et al. | |
| 9,149,001 B2 * | 10/2015 | Holtmann | A01F 12/28 |
| 9,504,204 B2 | 11/2016 | Kile | |
| 9,723,791 B1 * | 8/2017 | Kile | A01F 12/24 |
| 9,723,792 B1 * | 8/2017 | Kile | A01D 41/12 |
| 2005/0197176 A1 * | 9/2005 | Foster | A01F 12/24 |
| | | | 460/108 |
| 2006/0019731 A1 * | 1/2006 | Ricketts | A01F 12/26 |
| | | | 460/108 |
| 2007/0178951 A1 * | 8/2007 | Voss | A01F 12/28 |
| | | | 460/109 |
| 2009/0264169 A1 * | 10/2009 | Ricketts | A01F 11/06 |
| | | | 460/101 |
| 2012/0244921 A1 | 9/2012 | Reiger et al. | |
| 2014/0171164 A1 | 6/2014 | Foster et al. | |
| 2016/0295802 A1 * | 10/2016 | De Witte | A01F 12/26 |
| 2017/0164559 A1 * | 6/2017 | Matousek | A01F 7/062 |

\* cited by examiner

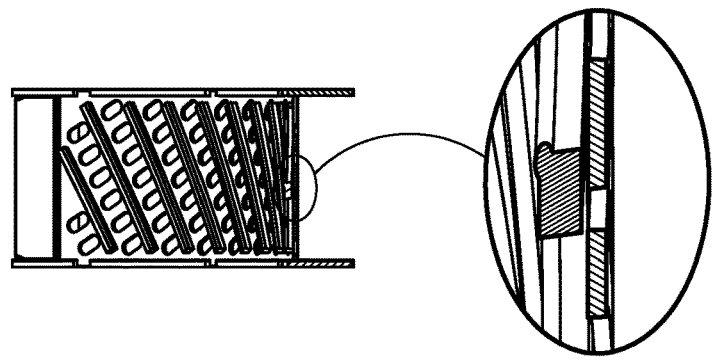
FIG. 24
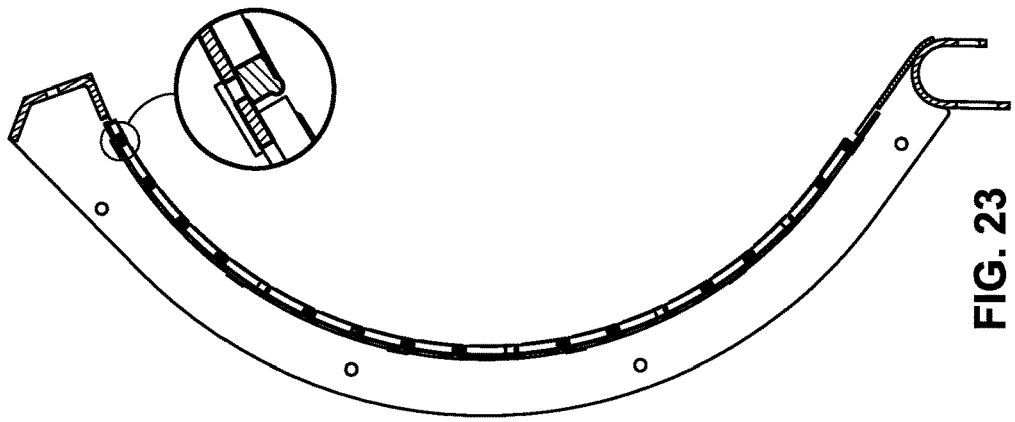
FIG. 23
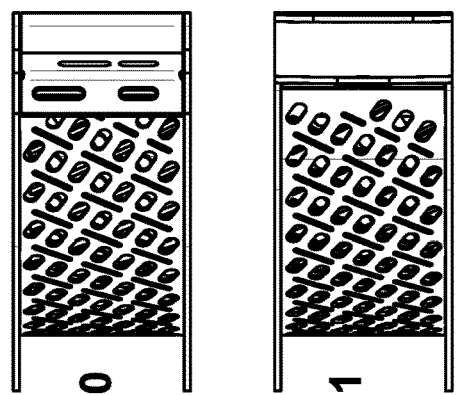
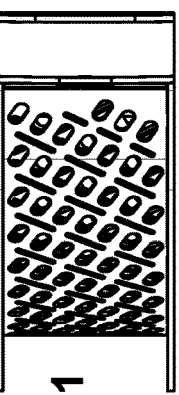
FIG. 20
FIG. 21
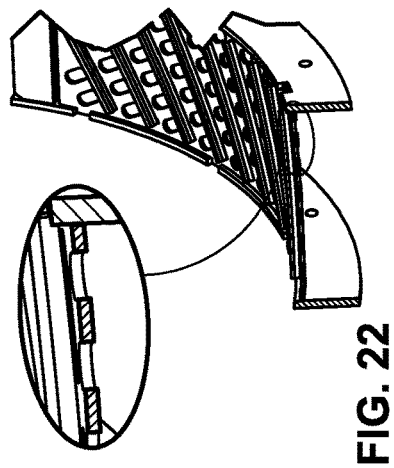
FIG. 22

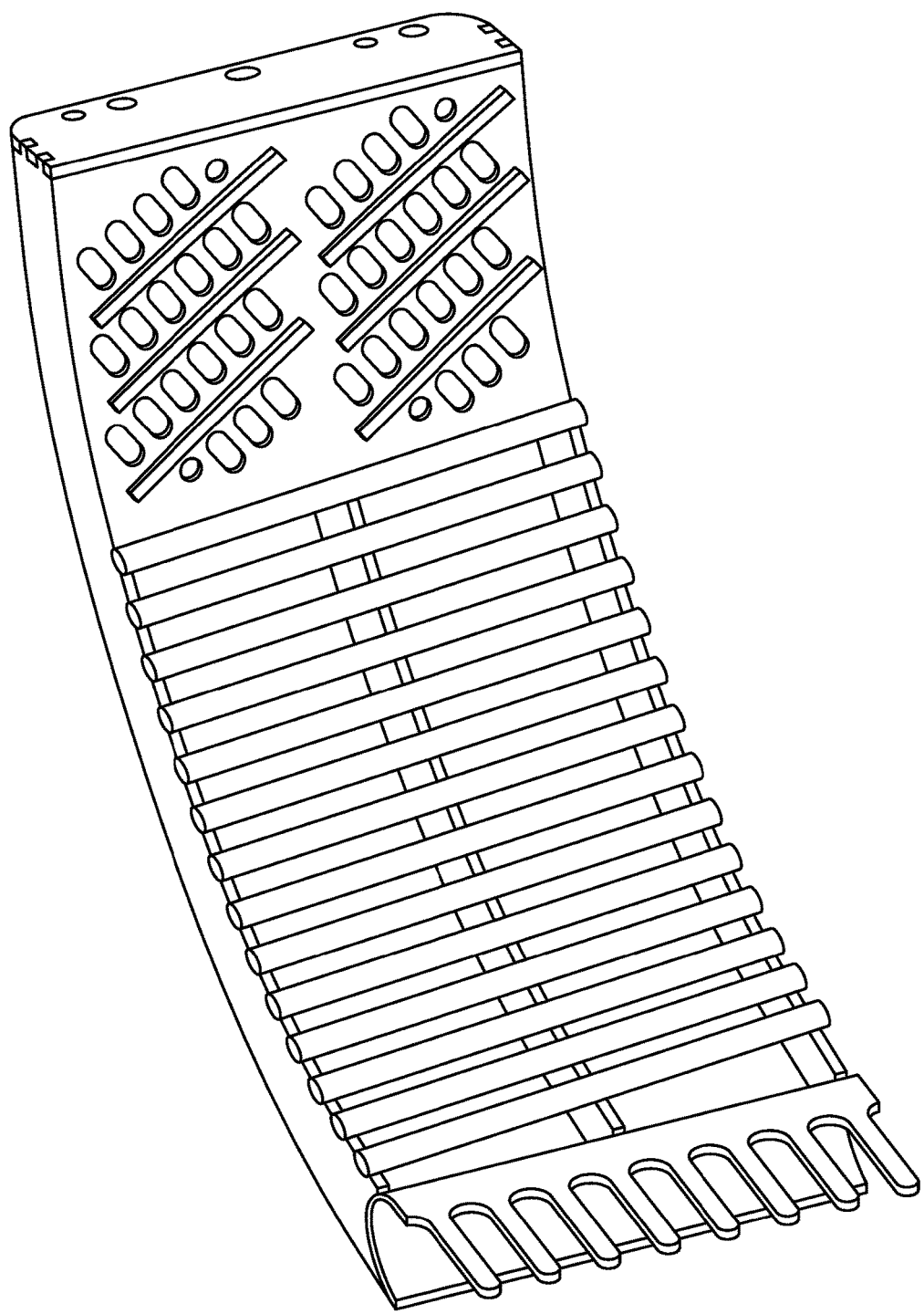
FIG. 33 - PRIOR ART

MULTI-THRESH CONCAVE SECTION FOR ROTARY COMBINE

This invention generally relates to concave grates for a rotary combine and more particularly to concave sections thereof.

BACKGROUND OF THE INVENTION

A rotary combine harvester, hereinafter referred to as a harvester is utilized to harvest crop from a field, separate the grain from the material other than grain (MOG) and to dispense these materials from the machine appropriately. These harvester tasks are complicated and difficult to accomplish. Indeed, not only do they need to be adapted to separate many different types of grains from MOG but they must also account for different crop conditions and weather conditions in which the harvesters must operate in.

A rotary combine harvester's main threshing and separating system consists of a large cylindrical rotor driven by the machines main engine. There are threshing elements attached to the rotor that cooperate with stationary elements, referred to as concaves, that surround the rotor in a rotor cage. Threshing and separating is accomplished by a combination of impact and rubbing action. As the rotor rotates, the grain crop is forced through a gap between the rotor and the concaves and begins a spiral path through the front (threshing) section and then through the rear (separating) section towards the exit area of the rotor/concave system. The impact and rubbing action causes the grains to be detached. By the time the crop is at the exit area almost all the grain has been separated from the MOG. The term for any grain that is remaining is called rotor loss. There are also other losses that can be attributed to the rotor/concave system, this is known as damaged grain loss (broken or cracked kernels).

As with any machine, performance is the key to efficiency. As mentioned above, performance of the threshing mechanisms is measured by: Threshing efficiency; Separating efficiency; and Grain damage. The machine operator has several means to adjust the threshing/separating efficiency vs. grain damage equation. The speed at which the rotor turns (RPM) is adjustable, the gap between the rotor and the concaves is adjustable, and the crop feed rate can be adjusted simply by running more or, less material into the machine. Also, the condition of the crop itself can have a dramatic effect on the loss vs. damage ratio. Crop moisture content, crop maturity, and crop type profoundly affect the machine performance. Along with all these variables and possible adjustments, the operator still might not get the machine to perform to acceptable levels. At this point the owner or operator may start looking at threshing/separating components they might install in place of conventional components.

Typically, new rotary combine harvesters will have installed a standard set of concaves, depending on the original equipment manufacturer. Present difficulties with current designs include concaves which cause excessive grain damage as the crop material continues its spiral flow.

BRIEF SUMMARY OF THE INVENTION

In one aspect, an embodiment of the invention provides a concave section for a harvester that extends only a partial width of more typically known concave sections. The concave section includes a first concave body. First concave body includes a first leading end, a first trailing end, a first upstream side, a first downstream side, and a first crop engagement face extending between the ends and the sides. The first crop engagement face comprises at least one of a first thresher profile portion and a first separator profile portion.

The partial width affords the opportunity for new different thresher or separator configurations in the concave region while reducing weight and easing installation (e.g. no greater than 10 inches and preferably 6-8 inches in width.

In another aspect, an embodiment of the invention provides a concave assembly for a harvester that includes a first concave section. The first concave section includes a first upstream side, a first downstream side, and a first crop engagement face located between the first sides. The concave assembly further includes a second concave section that includes a second upstream side, a second downstream side, and a second crop engagement face located between the second sides. The first and second concave sections are removably connected along the first downstream side and the second upstream side to form the concave assembly having a combined width of no greater than 20 inches.

In yet another aspect, an embodiment of the invention provides a method for separating grain from material other than grain from a crop. The method includes threshing the crop along a threshing profile of a first portion of a crop engagement face of a concave section and separating the grain from the material other than grain along a second portion of the crop engagement face of the concave section.

The concave section may include a combination profile that includes the first thresher profile portion and the first separator profile portions are of differing profiles. The first thresher profile portion is arranged at the first leading end and the first separator profile portion is arranged at the first trailing end with a configuration such that when mounted in the harvester, the first thresher profile portion is adapted to engage a flow of crop material prior to the first separator profile portion.

In an embodiment, a first concave body length is defined between the first leading end and the first trailing end. The first thresher profile portion extends from the first leading end to an intersection with the first separator profile portion at least ¼ and ½ of the total distance.

In an embodiment, the concave section includes the first thresher profile portion. The first thresher profile portion includes a radius plate that extends between the first sides. Upstanding rectangular rub bars are mounted on the radius plate and extend transversely between the sides and in rows extending from the first leading end toward the first trailing end. Open slots are defined by the radius plate. The open slots extend between the first sides and extend in aperture rows between the upstanding rectangular rub bars from the first leading end toward the first trailing end.

When used, the upstanding rectangular rub bars may extend greater than 75% of a width between the first upstream side and the first downstream side.

When used, each one of the open slots may have a longitudinal axis that extends within 15 degrees of perpendicular to a longitudinal axis of each one of the upstanding rectangular rub bars.

Each row of the upstanding rectangular rub bars may be spaced between 1 and 6 inches apart from another one of the rows of upstanding rectangular rub bars. Each one of the open slots may extend between the first sides and is spaced between ¾ and 4 inches apart.

Each row of the upstanding rectangular rub bars may be made up of a one of the upstanding rectangular rub bars. Each upstanding rectangular rub bar may have a longitudinal axis configured to extend perpendicular or within 25 degrees of perpendicular to a flow of crop material over the first crop engagement face.

There may be between 6 and 10 rows of upstanding rectangular rub bars that extend from the first leading end toward the first trailing end. The upstanding rectangular rub bars may extend at an angle between 0 and 60 degrees relative to a central rotor axis defined by the first concave body.

The first separator profile may extend from the intersection of the first thresher profile portion with the first separator profile portion to the first trailing end.

In an embodiment, the concave section includes the first separator profile portion includes separator bars that define smooth arcuate engaging surfaces. The smooth arcuate engaging surfaces face towards a central rotor cavity defined by the first concave body. Each one of the separator bars has a longitudinal axis extending transversely between the first sides. The separator bars are spaced between ¾ and 3 inches apart to define separator apertures therebetween.

When used each one of the upstanding rectangular rub bars and each one of the separator bars may have radially outermost peripheral surfaces facing a center rotor axis of the harvester. The outermost peripheral surfaces may define a concave surface radially equidistant from the center rotor axis.

When used, each separator bar may have an upstream end and a downstream end. Each one of the ends can mount into a respective receiving groove located on the corresponding first upstream and first downstream side of the concave section.

The first concave body can extend around a central rotor axis and defines a rotor cavity. The first thresher profile portion when employed includes upstanding rectangular rub bars having threshing surfaces that define a corner facing the rotor cavity. The upstanding rectangular rub bars are arranged in spaced apart relation. The first separator profile portion when employed includes separator bars that define a separator surface that is a smooth arcuate surface facing the rotor cavity. The separator bars are arranged in spaced apart relation.

When used, the upstanding rectangular rub bars may extend at an upstanding rectangular rub bar angle of between 0 and 60 degrees relative to the central rotor axis. The separator bars may extend at a separator angle of between 0 and 30 degrees relative to the central rotor axis.

The upstanding rectangular rub bars may be straight and arranged mutually parallel with each other. The separator bars may be straight and are arranged mutually parallel with each other.

The upstanding rectangular rub bars may be spaced apart a distance of between 1 and 6 inches. The separator bars may be spaced apart between ¾ and 3 inches.

Each of the upstanding rectangular rub bars may have a length of between 2 and 12 inches, a maximum thickness of between ⅛ and 1 inch, and a maximum width of between ⅛ and 1 inch. The smooth arcuate surface defines a minimum radius of curvature of between ⅛ and ½ inch.

The upstanding rectangular rub bars may be rectangular and the separator bars maybe cylindrical.

In an embodiment, the first upstream side includes a first upstream sideplate that extends perpendicular to the central rotor axis. The first downstream side includes a first downstream sideplate that extends perpendicular to the central rotor axis and is arranged parallel to the first upstream sideplate. The first leading end includes a first leading end plate assembly that couples the first upstream sideplate and the first downstream sideplate at the first leading end. The first trailing end includes a first trailing end plate assembly that couples the first upstream sideplate and the first downstream sideplate at the first trailing end. The separator bars are directly coupled to the first upstream and downstream sideplates.

The upstanding rectangular rub bars may be indirectly coupled to the first upstream and first downstream sideplates via a radius plate. The upstanding rectangular rub bars can be mounted on the radius plate and extend transversely between the first upstream and first downstream sideplates at an angle of between 0 and 60 degrees relative to the central rotor axis. The concave section may include further include open slots defined by the radius plate and between adjacent members of the upstanding rectangular rub bars. The open slots can have an area between 10 and 40 square inches and occupy between 7 and 60 percent of the area of the radius plate.

The separator bars may extend a full width between the first upstream and first downstream sideplates. The upstanding rectangular rub bars may extend a partial width that in between 50 and 100 percent of a full width between the first upstream and first downstream sideplates.

In an embodiment, the first crop engagement face has a first thresher profile portion and a first separator profile portion. The second crop engagement face has a second thresher profile portion and a second separator profile portion.

The first and second thresher profile portions can be the same relative to each other. The first and second separator portions can be the same relative to each other and different relative to the thresher profile portions.

The first thresher profile portion and the second profile portion may also be different relative to each other and relative to the separate profile portions.

In an embodiment, the concave assembly (e.g. two or more concave sections assembled) comprises a leading end and a trailing end that extend a total length between the ends of between 20 and 60 inches. The concave assembly defines a total assembly width between 8 and 20 inches. Total assembly width extends between the upstream face of the first concave section and the downstream face of the second concave section. The first concave section and the second concave sections have equal widths.

Such concave sections or assemblies can be integrated in a harvester. The harvester includes at least one partial width concave section for the harvester. The concave section includes a first concave body. First concave body includes a first leading end, a first trailing end, a first upstream side, a first downstream side, and a first crop engagement face extending between the ends and the sides. The first crop engagement face comprises at least one of a first thresher profile portion and a first separator profile portion. The harvester includes a vehicle having a bin. The harvester further includes a head at the front of the vehicle for engaging a crop to remove crop material. A rotor is interposed between the bin and the head. The rotor is proximate the concave section in a concave region. The concave region is adjacent a separator region of the harvester. The rotor has a spiral engaging element facing the concave section that is operable to impart a rotational spiral flow of crop material against the first concave body. More than three concave sections may be arranged in the concave region of the harvester.

Preferably, the concave section width is less than 8 inches.

For example, the concave section may be between 6 and 8 inches.

In an embodiment, the concave section has a weight of less than 50 pounds.

For example, the concave section can have a weight of between 30 and 50 pounds.

In an embodiment, a concave assembly includes a concave section for a harvester that includes a first concave body. The first concave body includes a first leading end, a first trailing end, a first upstream side, and a first downstream side. The first concave body has a width between the first upstream side and the second downstream side is no greater than 10 inches. A first crop engagement face extends between the first ends and the first sides. The first crop engagement face includes at least one of a first thresher profile portion and a first separator profile portion. The concave assembly further includes a second concave body with a second leading end, a second trailing end, a second upstream side and a second downstream side. A width between the second upstream side and the second downstream side is no greater than 10 inches. The second concave section includes a second crop engagement face extending between the second ends and the second sides; wherein the second crop engagement face is differently configured than the first crop engagement face, and wherein the first downstream side is adjacent the second upstream side.

In an embodiment the concave section may include only the first thresher profile portion. The second concave section includes the first separator profile portion and the first separator profile portion is of differing profile than the first thresher profile portion.

In an embodiment, at least 6 concave sections are arranged in the concave region of the harvester, and wherein additional separator sections are disposed in the separator region.

In an embodiment, at least one full thresh concave section is provided at an upstream location of the concave region, the full thresh concave section comprising only the first thresher profile portion.

In an embodiment, each of the concave sections comprises no combination profiles, but only one of the first thresher profile portion or the second separator profile portion, or other third thresher profile portion.

In an embodiment, at least 6 concave sections are provided, including at least one first concave section having threshing upstanding rectangular rub bars, a second concave section comprising annular separators at a first inclination orientation; and a third concave section comprising annular separators at a second inclination different from and less aggressive than the first inclination orientation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 20 is a top view of the concave section of FIG. 9;

FIG. 21 is a bottom view of the concave section of FIG. 9;

FIG. 22 is a cross section taken about line 22 of FIG. 18 with an enlarged area of the cross section depicted for clarity of the cross section;

FIG. 23 is cross section taken about line 23 of FIG. 18 with an enlarged area of the cross section depicted for clarity of the cross section;

FIG. 24 is cross section taken about line 24 of FIG. 18 with an enlarged area of the cross section depicted for clarity of the cross section;

FIG. 33 is a concave section of the prior art;

While embodiments the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
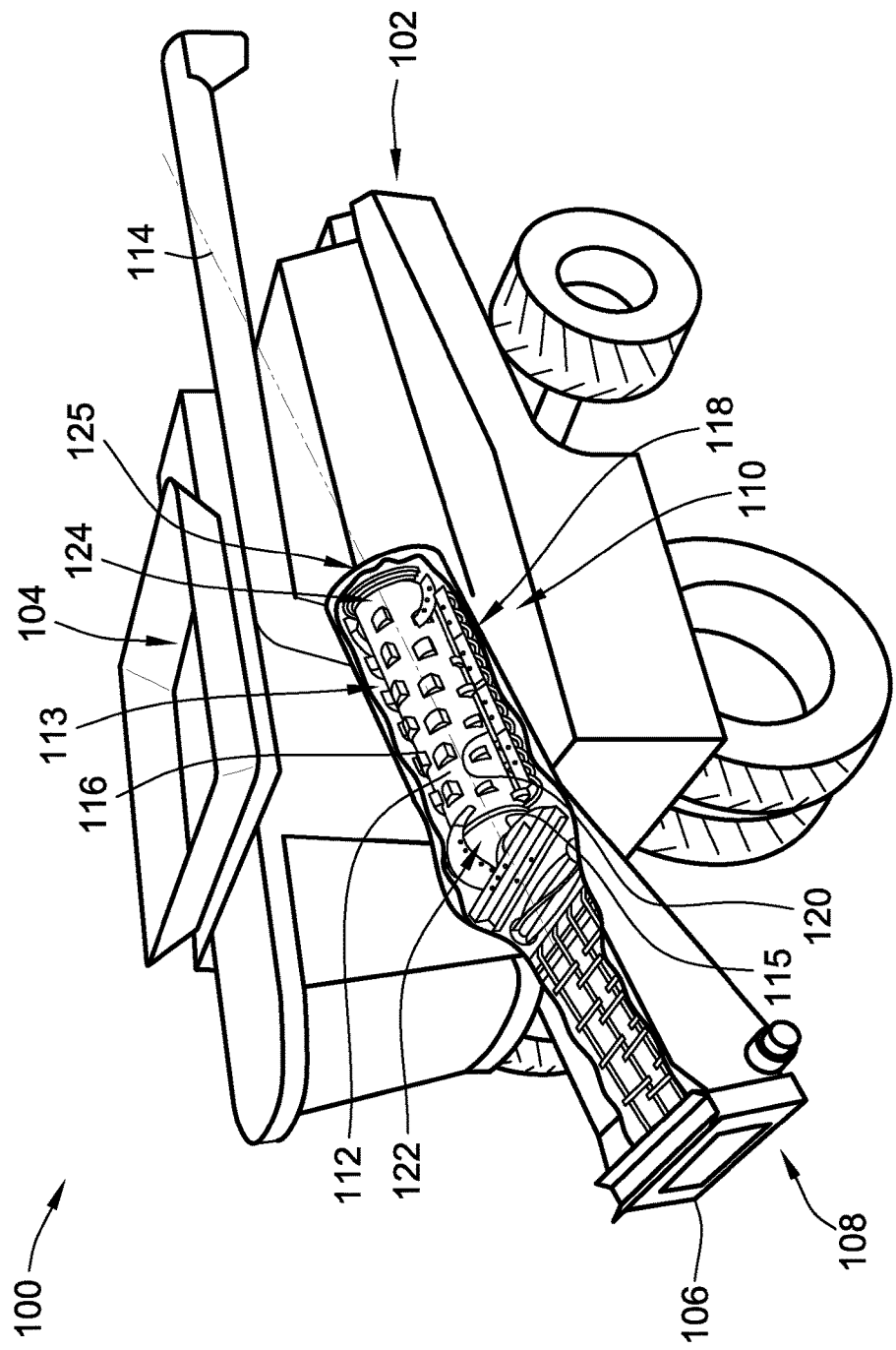
FIG. 1 is a schematic view of a rotary combine harvester employing a multi-thresh concave assembly according to the teachings of the present invention.

FIG. 1 illustrates a rotary combine harvester 100, that may be referred to herein as harvester 100. The harvester 100 includes a vehicle 102 having a bin 104 for storing harvested grain. The harvester 100 further includes a head 106 at front 108 of the vehicle 102 for engaging a crop to remove as much crop material as possible while retaining its grain.

The harvester 100 includes a threshing and separating system 110 which consists of a rotor 112 and a rotor cage 118. The rotor 112 defines a central rotor axis 114 about which rotor 112 rotates. The rotor 112 is interposed between the bin 104 and the head 106. Further, the rotor 112 is located proximate the rotor cage 118. The rotor 112 has a spiral engagement element 115 that faces the rotor cage 118 and is operable to impart a rotational spiral flow of the crop material against the rotor cage 118.

The rotor 112 also includes threshing elements 116 that extend radially away from the rotor axis 114 to define outermost peripheral surfaces of the rotor 112. A gap 120 is defined between the rotor cage 118 and outermost peripheral surfaces of the threshing elements 116. The crop material with its grain flows through the gap 120 from a front 122 of the rotor 118 to a rear 124 of the rotor 118 to separate the remaining crop material from its grain. Each one of the threshing elements 116 are positioned to cooperate with a respective crop engagements face (See e.g. 140 at FIG. 2) of the rotor cage 118 also referred to as a concave grate. The impact and rubbing action between the threshing elements 116 and the crop engagement faces cause the grains to be detached from the crop material. Thus, as discussed above, the gap 120 can be adjusted by changing out the threshing element 116 to increase or decrease its radial extension away from the central rotor axis 114. By the time the crop is at the rear 124 of the rotor 118 almost all the grain has been separated from the crop material.

Figure 10:
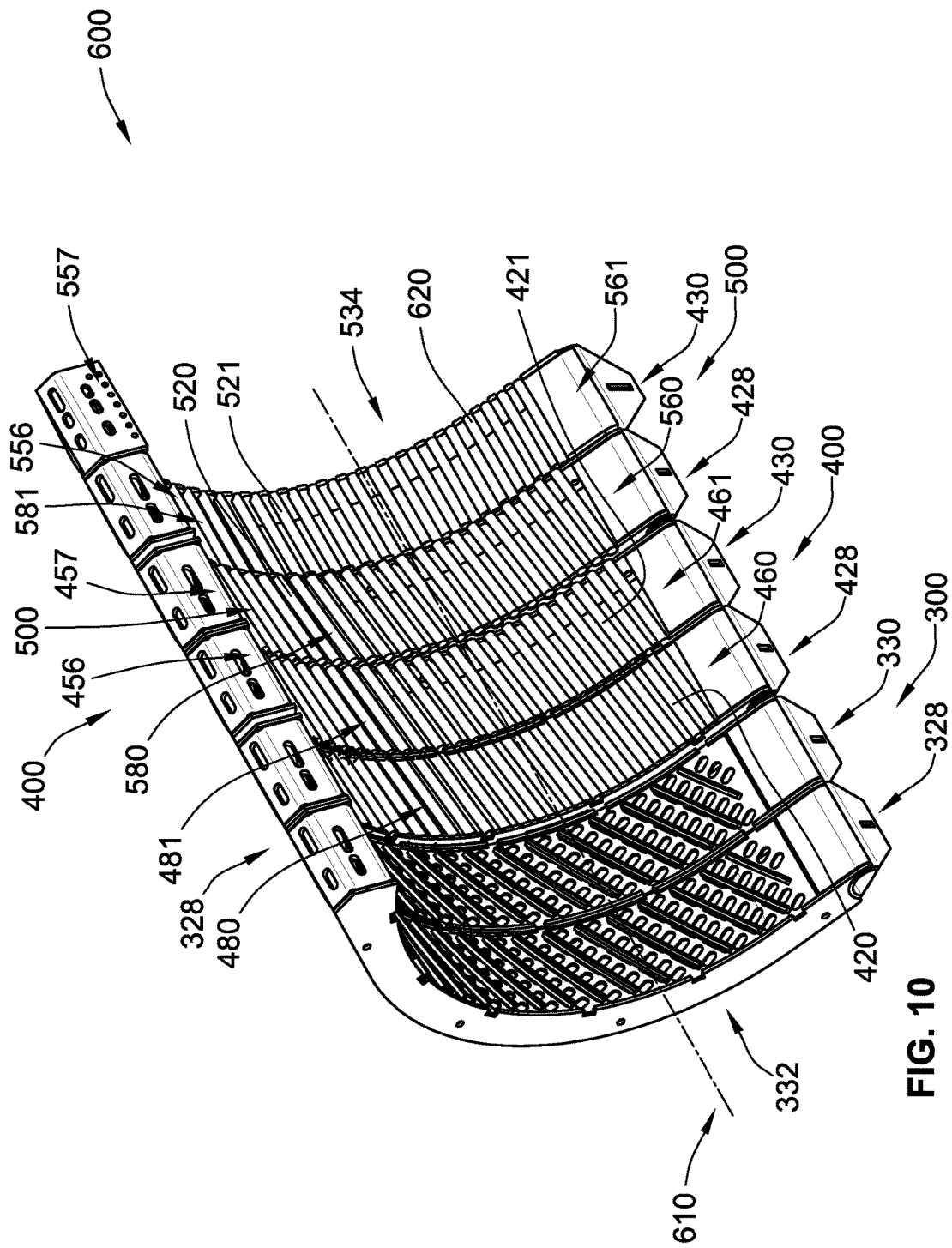
FIG. 10 is front left side perspective view of a rotor cage section with additional embodiments of concave assemblies and sections.

In an embodiment of the thresher and separating system 110 the rotor cage 118 includes a rotor cage section 600 (see FIG. 10). Six rotor cage sections 600 may be included in rotor cage 118. Yet other embodiments may include five or seven rotor cage sections 600 of the thresher separating system. Each rotor cage section 600 is made up of three concave assemblies 300, 400, 500 (see FIG. 10). Each concave assembly 300, 400, 500 is made up of a first 328, 428, 528 and a second 330, 430, 530 concave section for a total of six concave sections.

Returning to FIG. 1, the thresher and separating system 110 varies in function as the crop material proceeds from the front 122 to the rear 124 of the rotor 112. Thus, at the front 122, the rotor cage 118 may have three rotor cage sections 600 (FIG. 10) that function as a thresher to remove crop material from grain. Next, the rotor cage 118 may have three rotor cage sections 600 (FIG. 10) that function as a separator to gently remove grain from any remaining crop material. As is understood by those in the art, the separator region 125 having separator sections may be located adjacent the concave region of the rotor cage 118 and between rotor cage sections. Such separator region 125 has profiles on their separator sections as generally understood by those in the art such as tines or they may have profiles similar to concaves. It is not the intent to describe more fully the separator region 125 as such separator region and their location adjacent concave region of thresher/separating systems are generally known.

Figure 2:
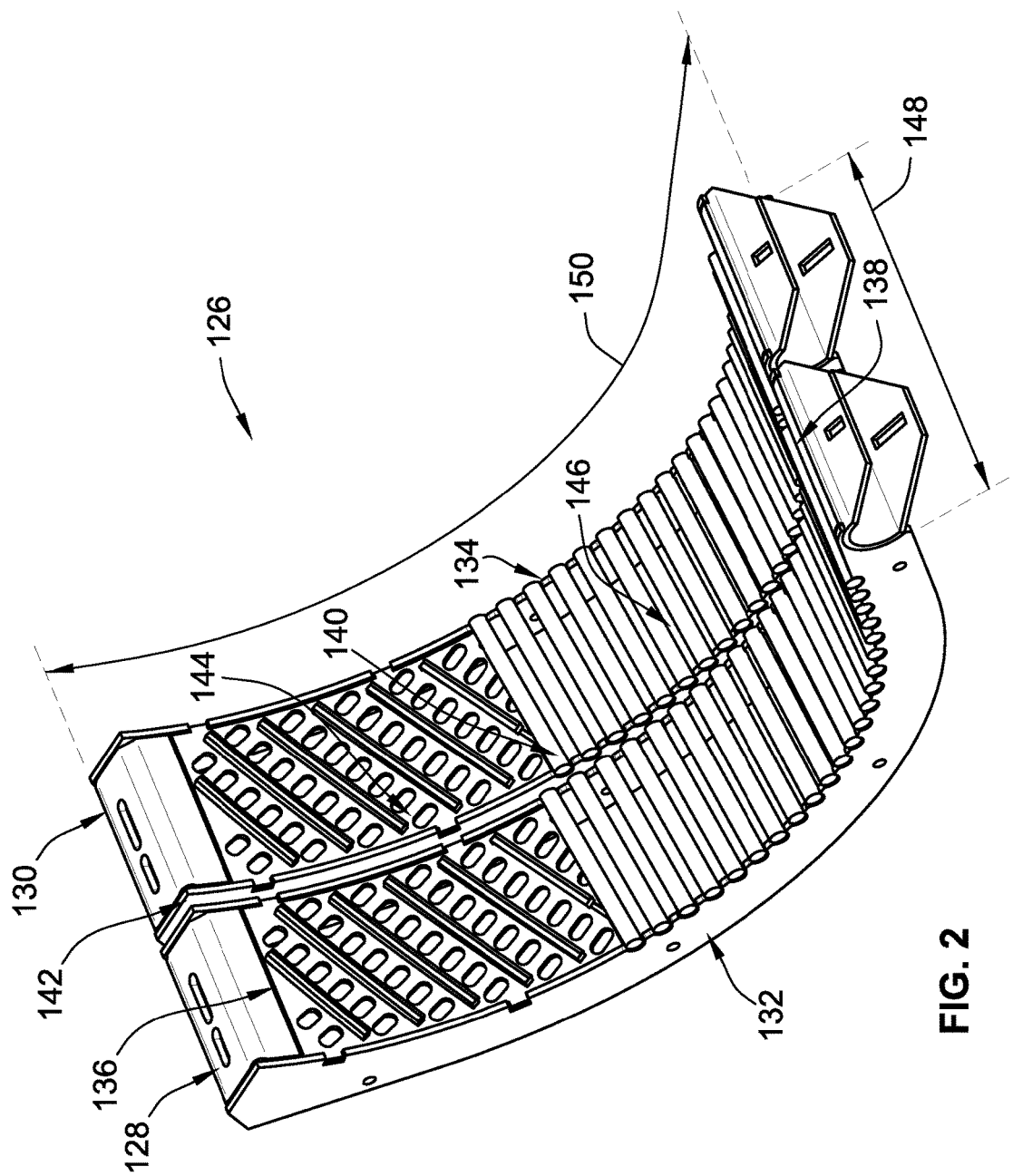
FIG. 2 is a front left side perspective view of a concave assembly of FIG. 1.

FIG. 2 illustrates an embodiment of a concave assembly 126 that alternatively may be used in the rotor cage section 600. The concave assembly 126 is made up of a first concave section 128 and a second concave section 130.

Concave assembly 126 includes an upstream side 132 and a downstream side 134. Use of the term "upstream" and "downstream" is relative to the flow of crop material from the front of the rotor 122 to the rear of the rotor 124. (FIG. 1). The concave assembly 126 includes a leading end 136 and a trailing end 138. Use of the terms "leading" and "trailing" is relative to where the crop material first engages the concave assembly 126. In other words, the crop material first engages the leading end 136 and proceeds to the trailing end 138. In the crop material's procession from the leading end 136 to the trailing end 138 it proceeds along a crop engagement face 140 of the concave assembly 126. The first concave section 128 and the second concave section 130 are joined at interface 142. As can be appreciated from FIG. 2 the crop engagement face 140 is a concave surface that cooperates with the cylindrical surface of the rotor 112 with its threshing elements 116. FIG. 1.

The crop engagement face 140 may include a thresher profile portion 144 and a separator profile portion 146. The concave assembly may have a width 148 defined between the upstream side 132 and downstream side 134 of between 4 and 12 inches and more preferably between 6 and 8 inches. The concave assembly 126 has an assembly length 150 defined between its ends of between 20 and 60 inches and more preferably between 20 and 40 inches.

Figure 3:
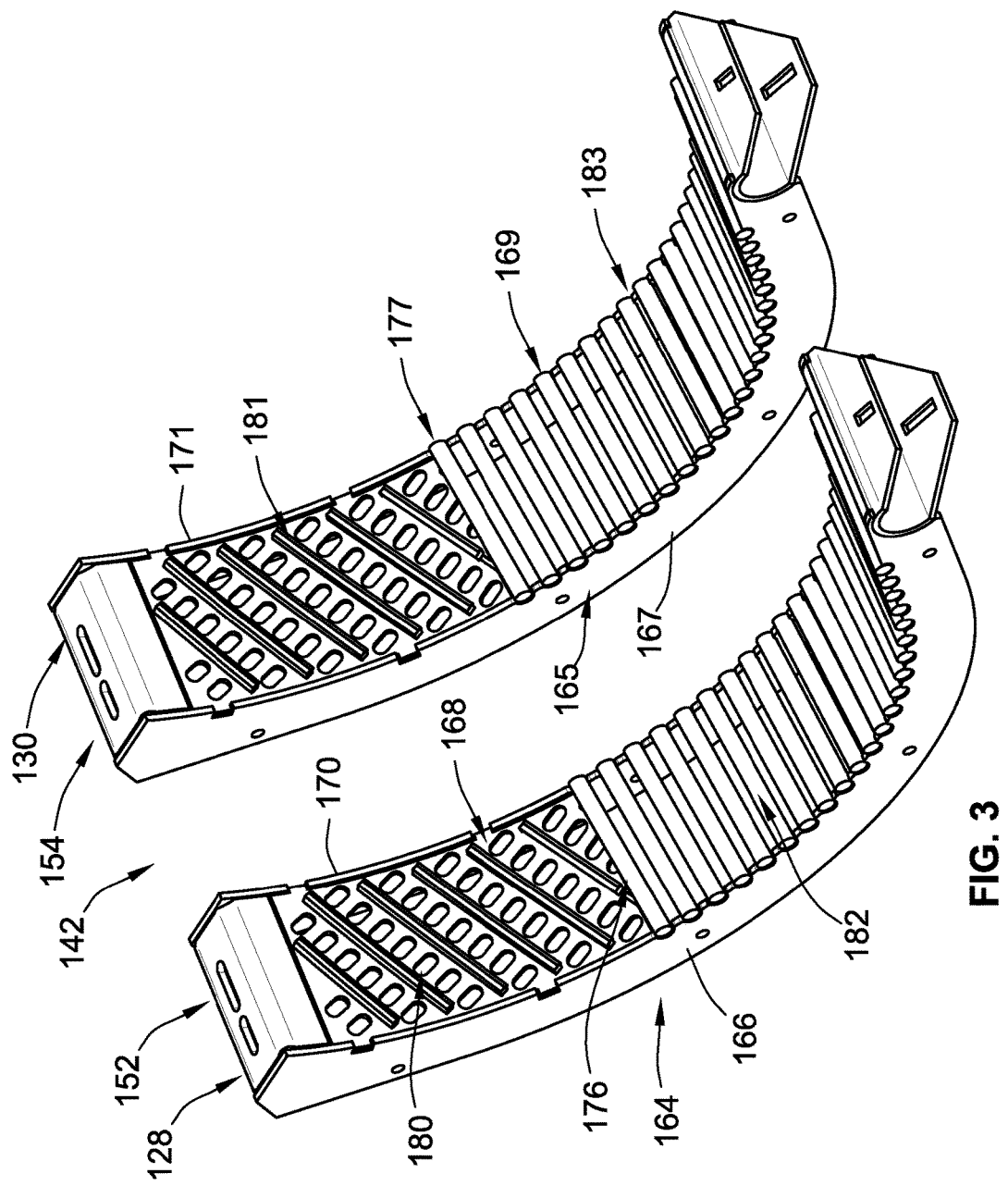
FIG. 3 is a front left side perspective view of first and second concave sections of the concave assembly of FIG. 2.

FIG. 3 illustrates the first concave section 128 and the second concave section 130 separated at their interface 142. This configuration in which concave sections may be separated and changed out, as desired so as to permit each concave section 126, 28 to be structured differently allows for a degree of control heretofore unknown. Further, the configuration has resulted as will be further discussed below, that the grain collected in the cleaning system (not illustrated) after it has been processed better balances the cleaning system for more efficient harvesting than previously known rotor cage assemblies.

The first concave section 128 includes a first concave body 152 and the second concave section 130 includes a second concave body 154. The first concave body 152 includes a first upstream side 164 having a first upstream sideplate 166 and a first downstream side 168 having a first downstream sideplate 170. A first crop engagement face 176 is located between the first sideplates 166, 170.

The second concave body 154 has a second upstream side 165 including a second upstream sideplate 167 and a second downstream side 169 having a second downstream sideplate 171. The second concave body 154 further includes a second crop engagement face 177 located between the second sideplates 167, 171. The first concave section 128 and the second concave section 130 are removably connected along the first downstream side 168 at the first downstream sideplate 170 and the second upstream side 165 at the second downstream sideplate 167 to form the concave assembly 126. By removably connected it is meant that there are no permanent weldment utilized or permanent soldering such that an operator would have to break the connection to remove either one of the sections 128, 130. In other words, the fastening means for connecting the sideplates 170, 167 are those such a nut and bolt that permit rapid and easy joinder and separation to meet any desired configuration for a concave assembly for a rotor cage section.

It should now be readily appreciated that the first upstream sideplate 166 and the first downstream sideplate 170 are interchangeable structures which advantageously permit for example in the second concave section 130 a coupling of its second upstream sideplate 167 with the second downstream sideplate 171 at the interface 142. In other words, all the sideplates 166, 170, 167 and 171 are interchangeable which allows for the coupling of any number of combinations of concave sections for example concave sections 128 and 130. However, as will be discussed in more detail below, many more combinations of concave sections may be combined to optimize threshing and separating in the rotor cage 118.

The first crop engagement face 176 extends between the ends 156, 160 and sides 164, 168. The first crop engagement face has a first thresher profile portion 180 and a first separator profile portion 182. The second crop engagement face 177 has a second thresher profile portion 181 and a second separator profile portion 183. It should be noted the structures of the first and second concave sections 128, 130 are the same except for their thresher and separator profile portions 180, 181, 182, 183. Although, as discussed below, in embodiments the thresher and separator profile portions may be structurally identical.

The first and second thresher profile portions 180, 181 may be structurally the same relative to each other or structurally different relative to each other. Further, the first and second separator profile portions 182, 183 may be the same relative to each other or different relative to each other and may be the same or different relative to the thresher profile portions 180, 181. In other words, an advantage of embodiments of the invention is not only that a concave assembly can be separated into concave sections or halves but each concave section, (here concave sections 128, 130) may one to four separate profile portions to provide a level efficiency (decreased rotor loss and decreased grain damage and decreased harvesting time) of threshing and separation in a threshing separation system heretofore unknown.

Figure 4:
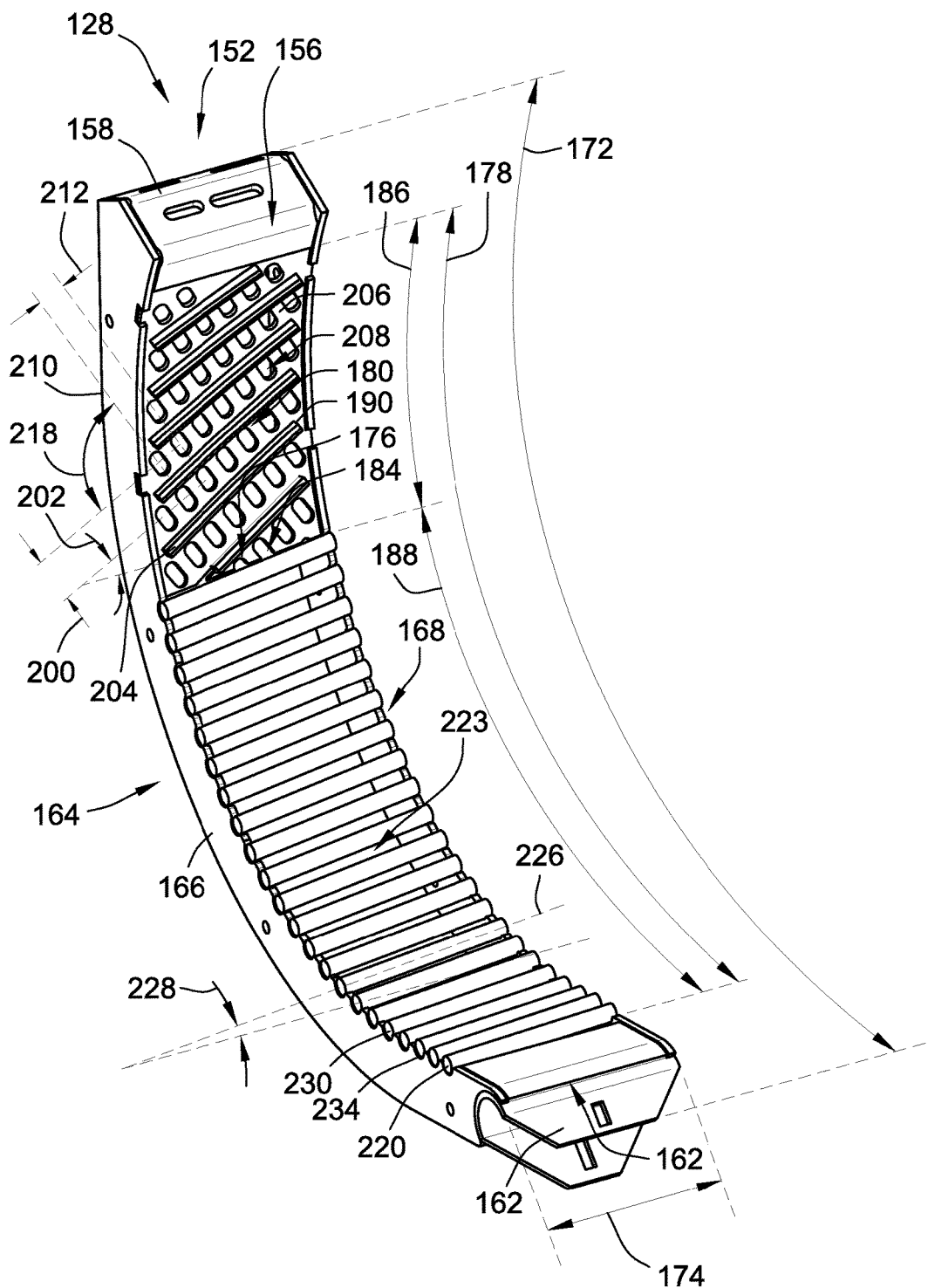
FIG. 4 is a front left side perspective view of the first concave section of FIG. 3.

FIG. 4 illustrates the concave section 128 including the concave body 152. The first concave body 152 extends around the central rotor axis 114 and defines the rotor cavity 113. Concave body 152 includes a first leading end 156 and a first trailing end 160. The first concave body 152 further includes the first upstream side 164 and the first downstream side 168. The first upstream side 164 of the first concave body 152 includes a first upstream sideplate 166 that extends perpendicular to the central rotor axis 114. The first downstream side 168 includes a first downstream sideplate 170 that extends perpendicular to the central rotor axis 114 and is arranged parallel to the first upstream sideplate 166.

The first leading end 156 of the first concave body 152 includes a first leading end plate assembly 158 that couples the first upstream sideplate 166 and the first downstream sideplate 170 at the first leading end 156. The first trailing end 160 includes a first trailing end plate assembly 162 that couples the first upstream sideplate 166 and the first downstream sideplate 170 to the first trailing end 160. The first concave body has a maximum length 172 defined between ends of the first and second end plate assemblies of between 20 and 60 inches and more preferably between 20 and 40 inches.

The first concave body has a full width 174 between the first upstream and the first downstream sideplates 164, 168 of between 3 to 10 inches and preferably between 6 and 8 inches and in certain embodiments 8 inches. The first concave body may have a weight between 10 and 75 pounds and preferably between 30 and 50 pounds. These small widths advantageously aid in significantly lessening the weight of concave sections hereto for known, for example that which is shown in FIG. 33. FIG. 33 is typical of a concave section having a full width of over 11 inches and a weight greater than 50 pounds. Embodiments of the instant invention advantageously allow for ease of handling for repair or change out because of their much smaller sizes and weight in addition to greater control of threshing and separation, as will be discussed further below, that greatly reduce rotor loss and grain damage.

The first crop engagement face 176 includes the first thresher profile portion 180 and the first separator profile portion 182. The first crop engagement face 176 extends a total length 178 from the first leading end 156 to the first trailing end 160 of between 20 and 60 inches.

The first thresher profile portion 180 includes a radius plate 206 that extends between the sides 164, 168. It further includes upstanding rectangular rub bars 190 mounted on the radius plate 206 and extending transversely between sides 164, 168 and in rows extending from the leading end 156 toward the trailing end 160. Typically, mounting may be by a weldment but other like means are possible as understood by those familiar with the art. The upstanding rectangular rub bars 190 are indirectly coupled to the first upstream and the first downstream sideplates 164, 168 via the radius plate 206. Open slots 208 are defined by the radius plate 206 and extend between the sides 164, 168. Further, the open slots 208 extend in aperture rows between the upstanding rectangular rub bars 190 from the first leading end 156 toward the first trailing end 160.

Each one of the open slots 208 has a longitudinal axis 210 extending within 15 degrees of perpendicular to a longitudinal axis 198 of each one of the upstanding rectangular rub bars 190. Each open slot 208 is spaced a distance 212 of between ¾ and 4 inches and more preferably between ¾ and 1¼ inches. Each open slot has an overall length 214 (measured along the longitudinal axis 198) of between ¾ and 1¼ inches. Each one of the open slots 208 extends between the sides 164, 168 and is spaced between ¾ and ¼ inches apart. The open slots 208 are located between adjacent members of the upstanding rectangular rub bars 190. The open slots 208 each have an area of between 10 and 40 square inches and occupy between 7 and 60 percent of an area of the radius plate 206. In a more preferred embodiment, the open slots 208 have an area of between 20 and 50 square inches and occupy between 30 and 70 percent of an area of the radius plate 206.

The first thresher profile portion 180 extends a total length of 186 from the leading end 156 to an intersection 184 with the separator profile portion 182. In other embodiments it may extend all the way to the first trailing end 160. In embodiments the thresher profile portion 180 may extend at least one quarter to one half of the length 186 between the first ends 156, 160. However, as can be readily appreciated, other embodiments of the invention provide the first thresher profile portion 180 may extend the entire length 178 of the first crop engagement face 176 and in yet other embodiments the first thresher profile 180 may extend a much or little of the length 176 as desired for efficient threshing and separation.

Figure 5:
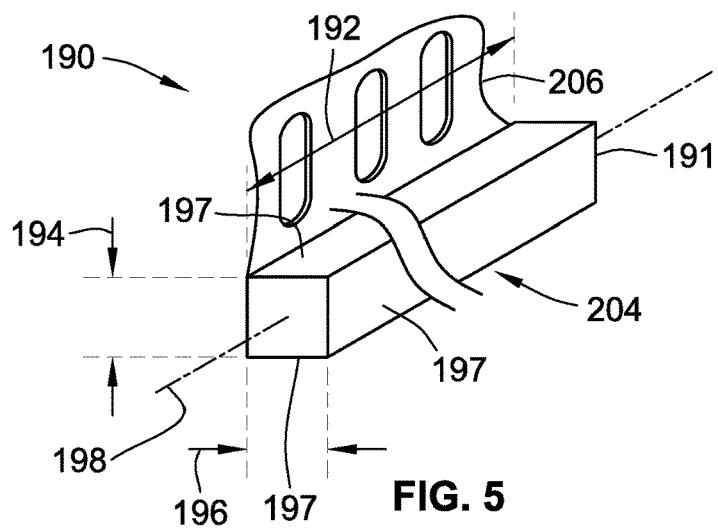
FIG. 5 is a blown up front right side perspective view of an upstanding rectangular rub bar of the first concave section of FIG. 4.

Referring now to FIGS. 4 and 5 with respect to the upstanding rectangular rub bars 190. The first thresher profile portion 180 includes upstanding rectangular rub bars 190 having threshing surfaces 197 that define at least one corner 204 facing the rotor cavity 113. As illustrated in FIG. 5, two corners 204 may be defined by the threshing surfaces 197 and face the rotor cavity 113. The upstanding rectangular rub bars 190 are arranged in a spaced apart relationship. Further, the upstanding rectangular rub bars 190 are straight and are arranged mutually parallel with each other. Each row of the upstanding rectangular rub bars 190 is made up of a one of the upstanding rectangular rub bars 190. Each row of the rectangular rub bars 190 is spaced between 1 and 6 inches apart from another one of the rows of upstanding rectangular rub bars 190 and more preferably between 1 and 2½ inches.

Additionally, the upstanding rectangular rub bars 190 are rectangular in shape and each one defines a longitudinal axis 198 configured to extend at an angle perpendicular or within 25 degrees of perpendicular to a flow 198 (FIG. 3) of the crop material over the first engagement face 176. In other embodiments, the angle may be more than ninety where less threshing force is desired. Further, the upstanding rectangular rub bars 190 extend at an angle 202 between 0 and 60 degrees and more preferably between 20 and 40 degrees relative to a central rotor axis 114 defined by the first concave body 152. In other embodiments, the angle 202 may be less than the forgoing range to provide a decreased threshing force.

The upstanding rectangular rub bars 190 have a maximum thickness 194 between ⅛ and 1 inch and more preferably between ¼ and ⅜ inch. Each of the upstanding rectangular rub bars 190 have a length 192 of between 3 and 12 inches and more preferably between 6 and 7 inches. Further, the upstanding rectangular rub bars 190 have a maximum height of between ⅛ and 1 inch and more preferably between ¼ and ⅜ inch.

There may be between 2 and 20 rows of upstanding rectangular rub bars 190 and more preferably between 6 and 10 rows of upstanding rectangular rub bars 190 that extend from the first leading end 156 toward the first trailing end 160. The first separator profile portion 182 extends from an intersection 184 of the first thresher profile portion 180 with the first separator profile portion 182 to the first trailing end 160. The upstanding rectangular rub bars 190 extend a partial width that is between 20 and 100 percent and more preferably between 80 and 100 percent of the full width 174 between the first upstream and the first downstream sideplates 164, 168.

Figure 7:
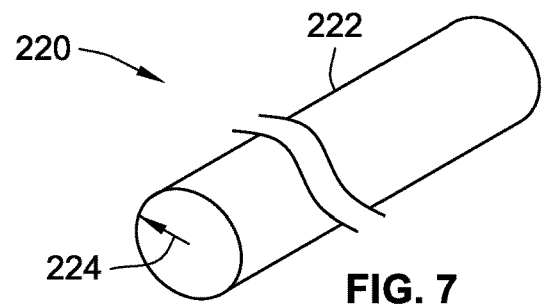
FIG. 7 is a blown up front right side view of a separator bar of the first concave section of FIG. 4.
Figure 6:
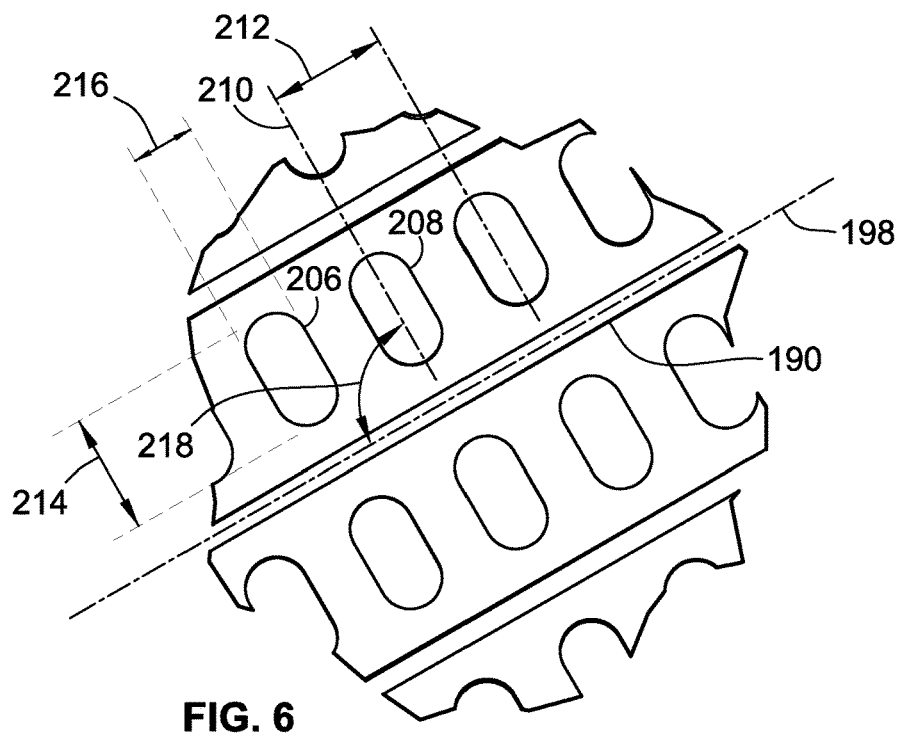
FIG. 6 is a blown up partial cross section of a first portion thresher profile of a first crop engagement face of the first concave section of FIG. 4.
Figure 8:
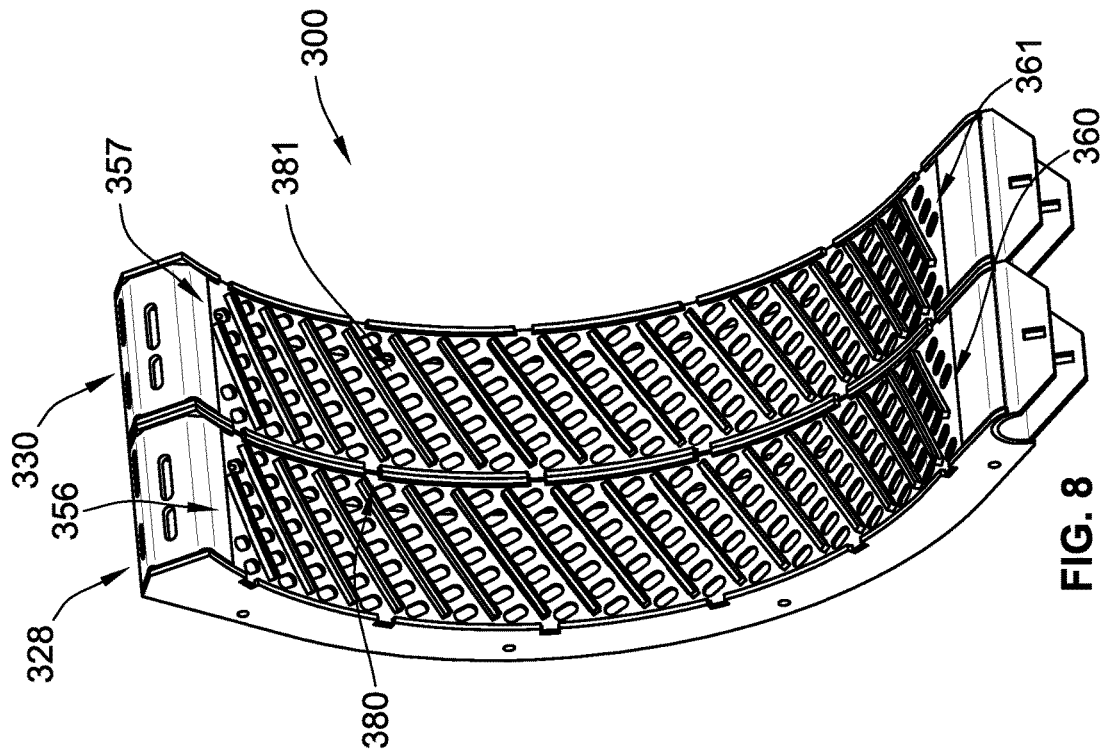
FIG. 8 is a front left side perspective view of a second embodiment of concave assembly.

Referring now to FIGS. 4, 6 and 8 with respect to the first separator profile portion 182, the first separator profile portion 182 includes separator bars 220. Each separator bar 220 defines a smooth arcuate engaging surface 222 defining radially outermost peripheral surfaces. Radially outermost is understood to be along a radius extending away from the radius plate 206 towards the central rotor axis 114 and central rotor cavity 113. The smooth arcuate surfaces advantageously provide for a gentle separation of the grain from the MOG and provide for reduced damage to the grain. The smooth arcuate surface 222 defines a minimum radius of curvature 224 (FIG. 7) of between 1/16 and 2 inches and more preferably between ¼ and ½ inches.

The separator bars 220 are generally cylindrical in shape and are straight. They are arranged mutually parallel with each other. The separator bars 220 are spaced apart between ¾ and 3 inches and more preferably between 1 and 1½ inches. Each one of the separator bars 220 defines a longitudinal axis 226 that extends transversely between the sides 164, 168. Each separator bar 220 has an upstream end 230 and a downstream end 232. Each one of the ends 230, 232 mounts into a respective receiving groove 234 located in the first upstream side 164 and the first downstream side 168 of the concave section 128. The separator bars 220 are directly coupled to the first upstream sideplate 166 and the first downstream sideplate 170. Typically the separator bars are welded in the groove but other means, as understood in the art may be utilized.

The separator bars 220 extend from an intersection 184 of first thresher profile portion 180 with the first separator profile portion 182 to the first trailing end 160. Separator bars 220 extend at a separator angle 228 of between 0 and 30 degrees relative to the central rotor axis 114.

The upstanding rectangular rub bars 190 define an outermost peripheral surface 191 (FIG. 5) and each one of the separator bars 220 defines a radially outermost peripheral surface 222 (FIG. 7). The radially outermost peripheral surfaces 191, 222 face the center rotor axis 114 of the rotor 112 of the harvester 100. The outermost peripheral surfaces 191, 222 define a concave surface radially equidistant from the central rotor axis 114.

Open slots 208 together with separator apertures 223 permit the passing of grain therethrough to a cleaning system (not illustrated) for reception of grain material passing therethrough. Also illustrated is the angle 218 between the longitudinal axis 210 of the open slot 208 and the longitudinal axis 198 of the upstanding rectangular rub bar 190 that is preferably within 15 degrees of perpendicular to facilitate threshing.

One of the advantages of concave assemblies 126 according to certain embodiments having first concave sections 128 and 130 and the ability to control the first threshing and separator profiles 180, 182 and second threshing and second separator profiles 181, 183 along the entire rotor cage 118 is that it provides a much better balance in the cleaning system heretofore unknown that facilitates timely threshing and separation and further rotor loss and damaged grain loss has been found to be reduced.

Figure 9:
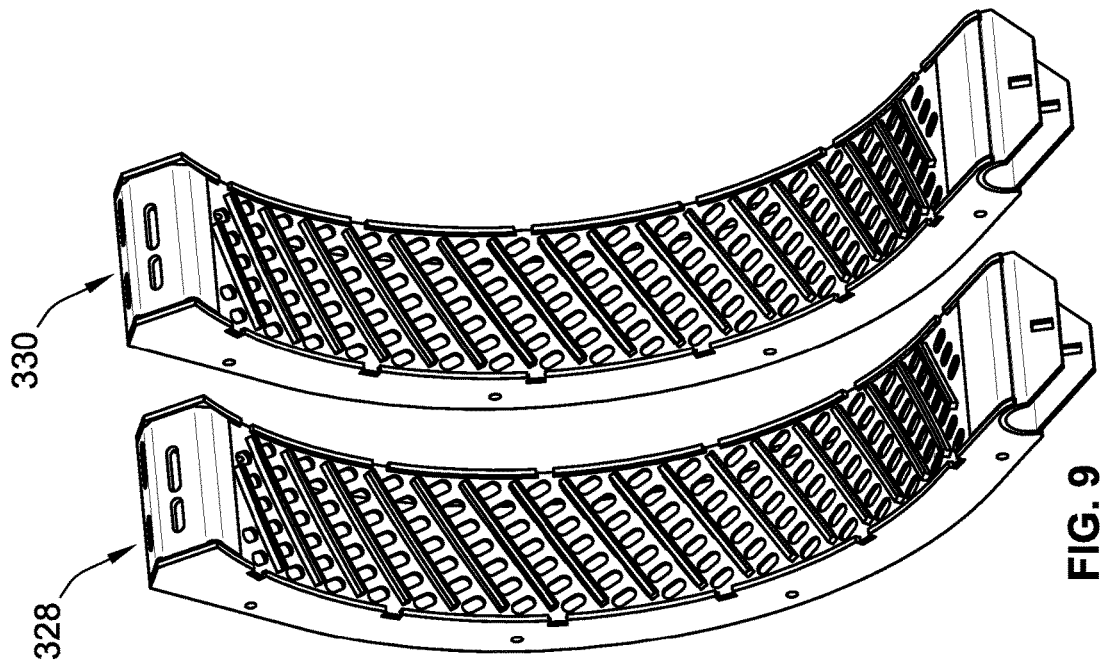
FIG. 9 is a front left side perspective view of first and second concave sections of the concave assembly of FIG. 8.

The present embodiments provide for various improvements over prior art concave sections of a full width such as those for example of FIG. 33. FIG. 33 was discussed briefly above and illustrates a concave section that has a crop engagement face that cannot be changed. It can only provide one fixed threshing profile or separation profile or combination. It is significantly heavier and wider than the embodiments described herein which makes it (FIG. 33) much more difficult to handle and install. Further, it does not provide the flexibility discussed above of, of the embodiments of the partial width concave sections 126 or 128 that allow for changing out the crop engagement face such that anywhere from one to four different profiles could be present and easily interchanged by simply removing a one of or both partial width concave sections 126, 128 to provide the desired degree of threshing or separation or both. Indeed, the widths and weights and profiles of the concave sections 126, 128 have resulted in a reduction of rotor loss and grain damage over those concave sections like those in FIG. 33 which have greater widths and weight and less flexibility in threshing and separator profiles than embodiments of the concave sections of the instant invention such as those concave sections 126, 128. With reference now to FIGS. 8 and 9, concave assembly 300 is illustrated. Concave assembly 300 is similar in most respects to concave assembly 126 with the following exceptions. The concave assembly 300 includes a first concave section 328 and a second concave section 330 that are coupled as with the concave sections 128 and 130 previously described. However, in this embodiment the first threshing profile portion 318 extends from the first leading end 356 to the first trailing end 360 and the second thresher profile portion 381 extends from the first leading end 357 to the first trailing end 361. Thus, in embodiment 300 the entire concave assembly 300 is configured for threshing.

FIG. 10 as previously discussed illustrates rotor cage section 600 which includes concave assembly 300, concave assembly 400 and concave assembly 500. As previously discussed, concave assembly 300 consists entirely of first and second thresher profile portions 380, 381 that extend respectively from leading ends 356, 357 to trailing ends 360, 361. However, concave assembly 400 consists of separator profile portions 480, 481 that extend from leading ends 456, 457 to trailing ends 460, 461. Concave sections 528 and 530 have first and second separator profile portions 580, 581 that extend between leading ends 556, 557 to trailing ends 560, 561. It is also readily apparent that the separator bars 420, 421 have a greater threshing angle defined between the separator bars 420, 421 and the central axis 610 defined by the rotor cage section 600 than the separator bars 520, 521. Indeed, separator bars 520, 521 extend perpendicular relative to an upstream side 332 and a downstream side 534 of rotor cage section 600. As discussed with the upstanding rectangular rub bar, the greater the angle of the separator bars 420, 421, 520, 521 with the central axis 610, the greater the separation force on the grain. Accordingly, with separator bars 520 and 521 being configured to be nearly parallel with the central axis 610, not only do the arcuate separator surfaces lower the amount of damage to the grain but also the angle with respect to the central axis 610 advantageously reduces damage to the grain passing to the cleaning system.

Figure 11:
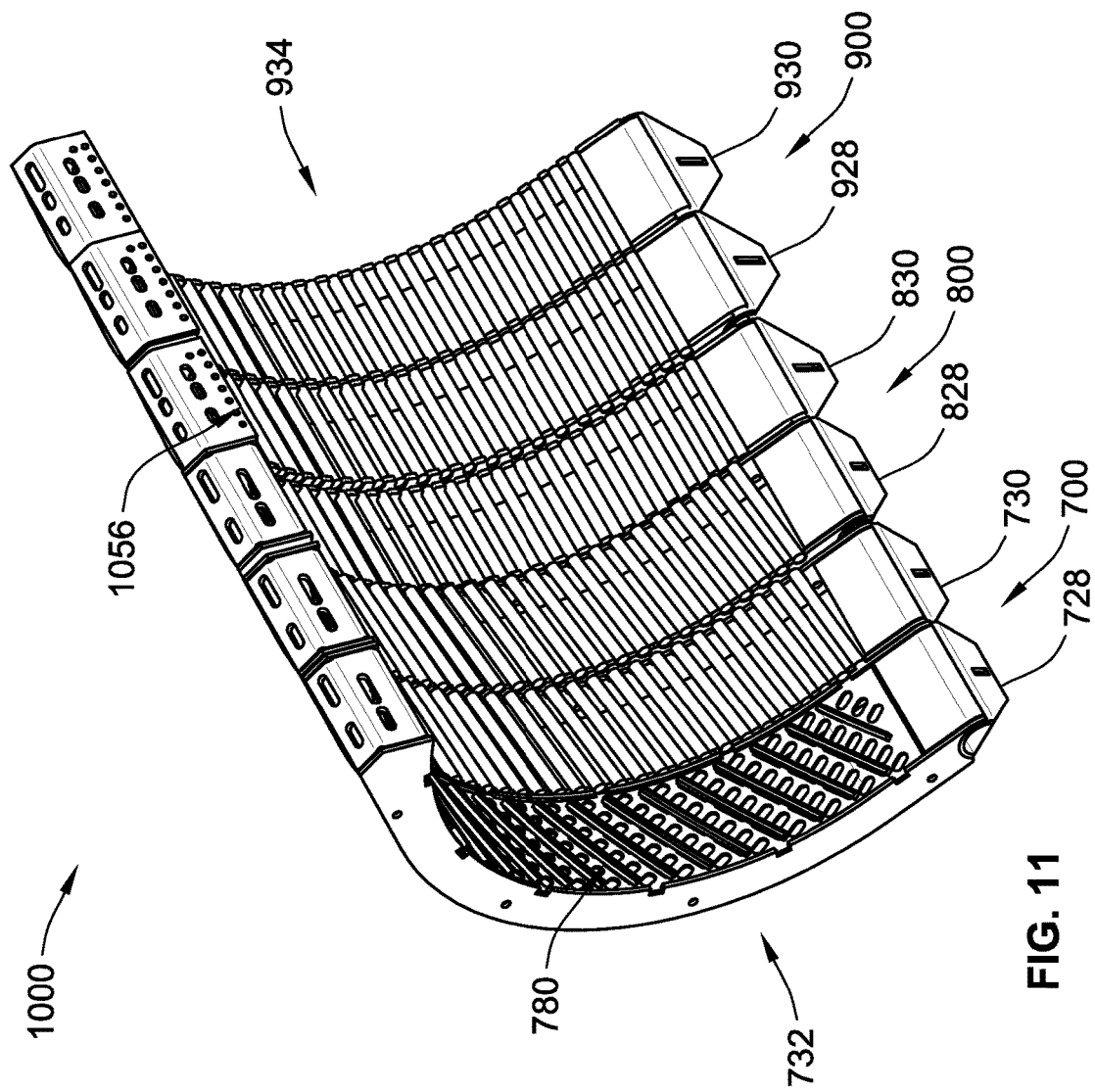
FIG. 11 is a front left side perspective view of another embodiment of a rotor cage section with additional embodiments of concave assemblies and sections.

FIG. 11 illustrates embodiment 1000 of a rotator cage section. Rotator cage section 1000 is configured for increased separation and decreased threshing with respect to FIG. 10. That is, rotor cage section 1000 includes concave assemblies 700, 800 and 900. Concave assembly 700 includes concave sections 728 and 730. Concave assembly 800 includes concave sections 828, 830. Concave assembly 900 includes concave sections 928 and 930. Here only concave section 728 includes a first thresher profile portion 780 that extends from a leading end 1056 to a trailing end 1060 of the rotator cage section 1000. The remaining sections all have separator profiles. In other words, in FIG. 10 two of the six concave sections have threshing profiles while here only one of the six concave sections has a threshing profile. Accordingly, rotor cage section 1000 is configured to have greater separation function than rotator cage 600 of FIG. 10.

Figure 12:
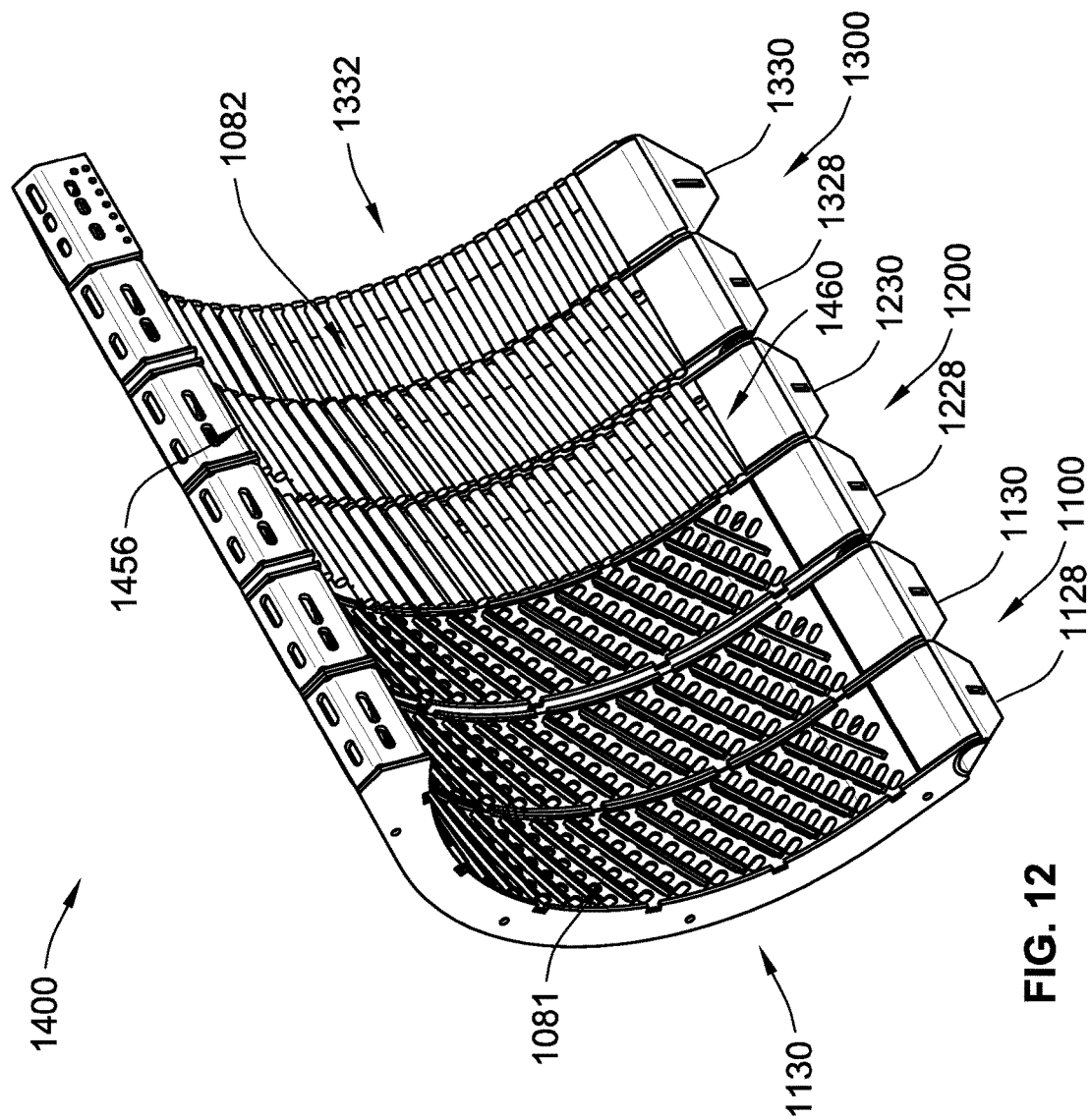
FIG. 12 is a front left side perspective view of another embodiment of a rotor cage section with additional embodiments of concave assemblies and sections.
Figure 15:
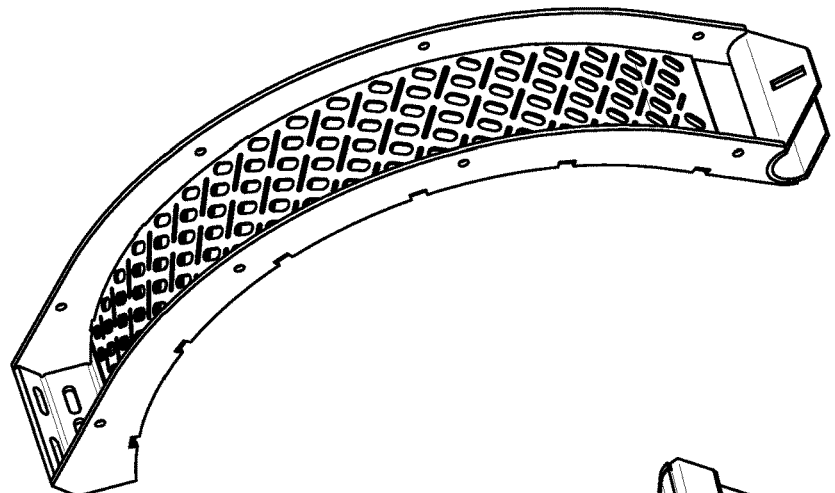
FIG. 15 is a rear top perspective view of the concave section of FIG. 9.
Figure 14:
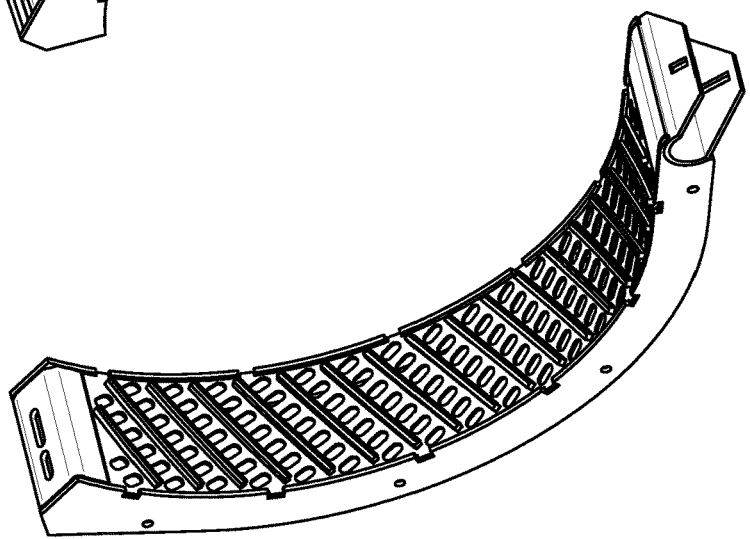
FIG. 14 is a front left bottom perspective view of the concave section of FIG. 9.
Figure 13:
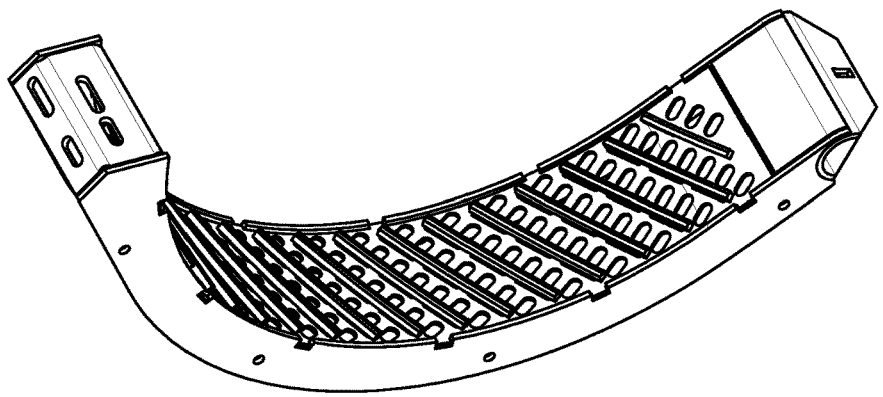
FIG. 13 is another front left top side perspective view a concave section of FIG. 9.
Figure 19:
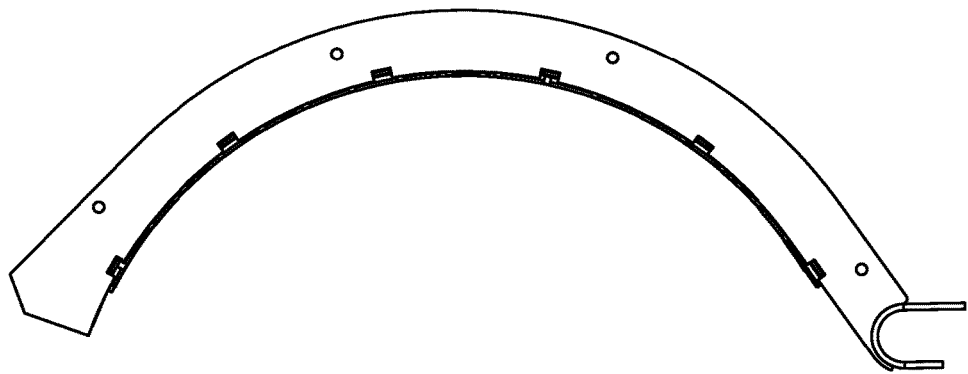
FIG. 19 is a right side view of the concave section of FIG. 9.
Figure 18:
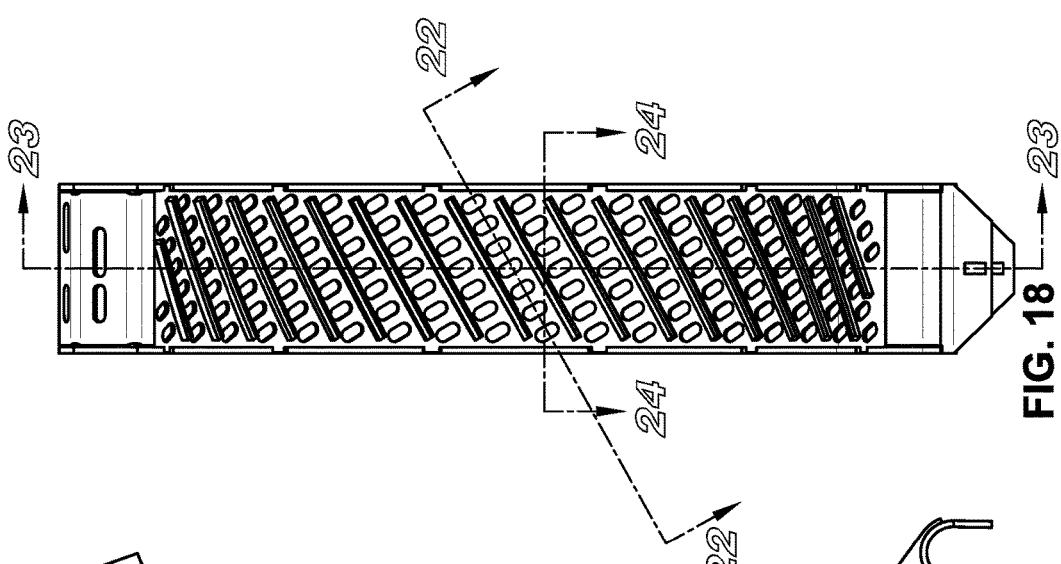
FIG. 18 is a front view of the concave section of FIG. 9.
Figure 17:
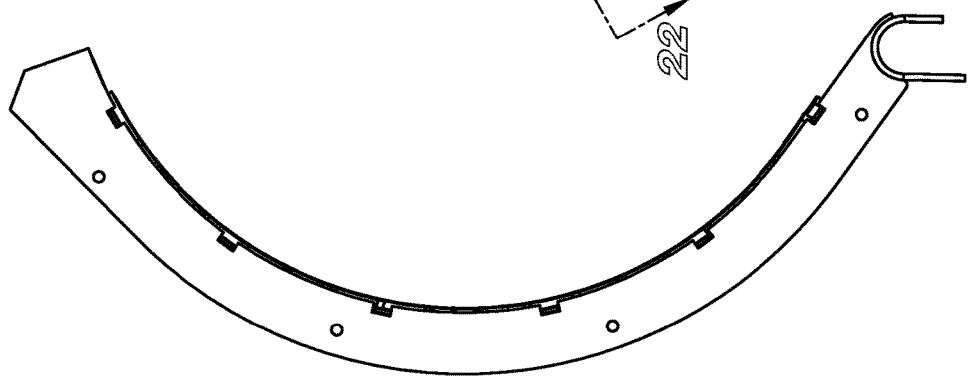
FIG. 17 is a left side view of the concave section of FIG. 9.
Figure 16:
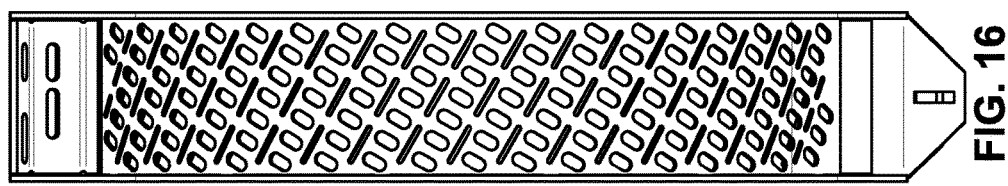
FIG. 16 is a rear view of the concave section of FIG. 9.
Figure 26:
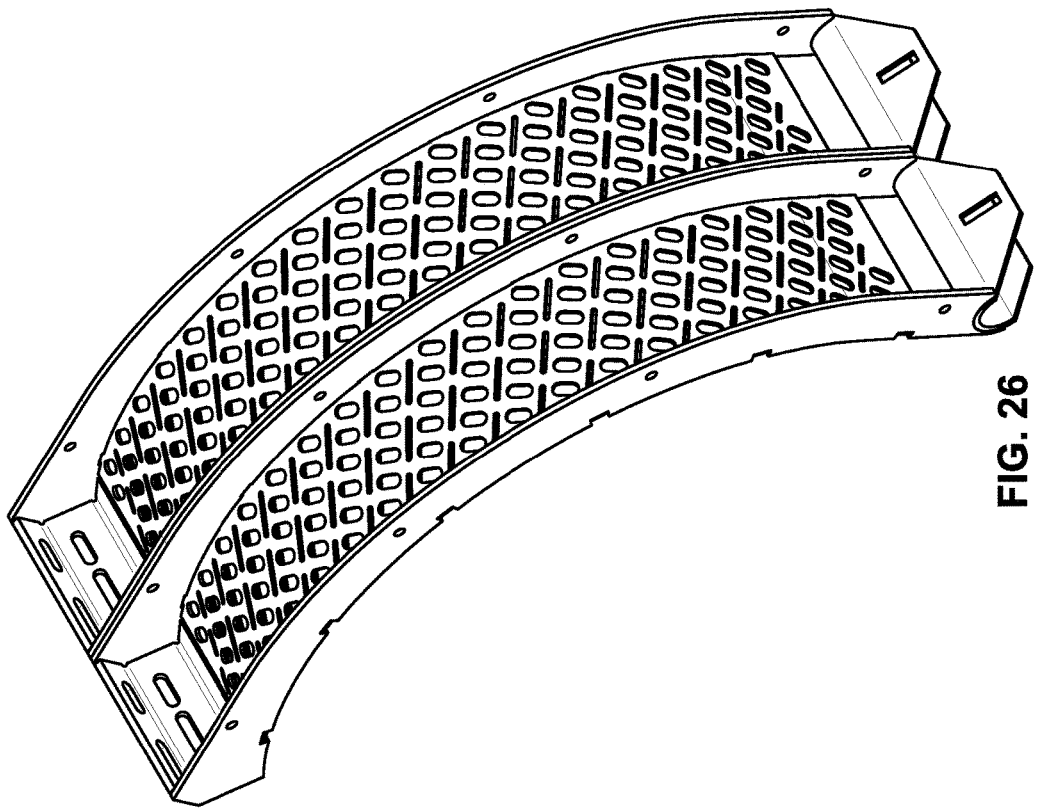
FIG. 26 is a rear right top side perspective view of the concave assembly of FIG. 8.
Figure 25:
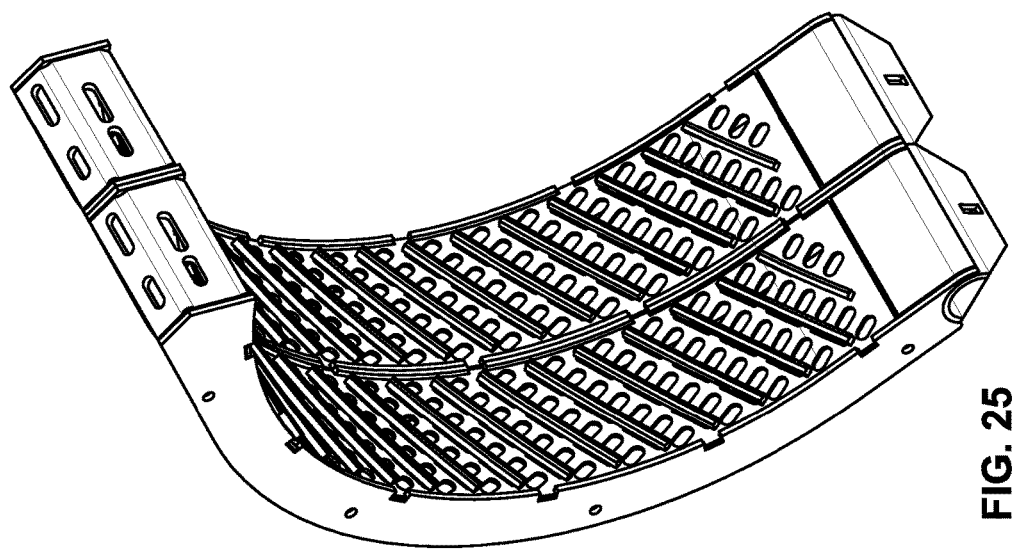
FIG. 25 is another front left side top view of the concave assembly of FIG. 8.
Figure 30:
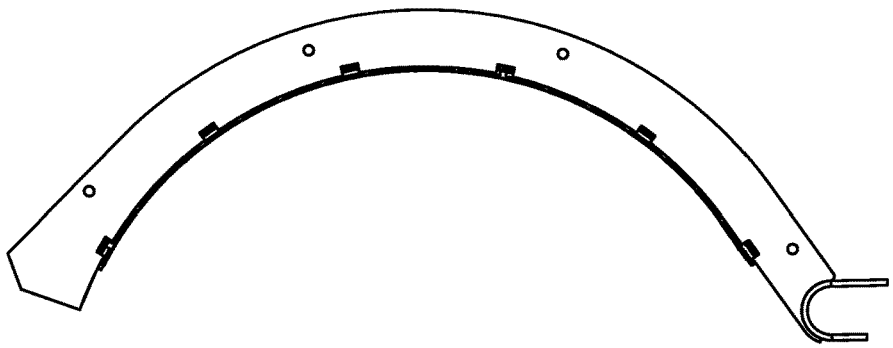
FIG. 30 is a right side view of the concave assembly of FIG. 8.
Figure 29:
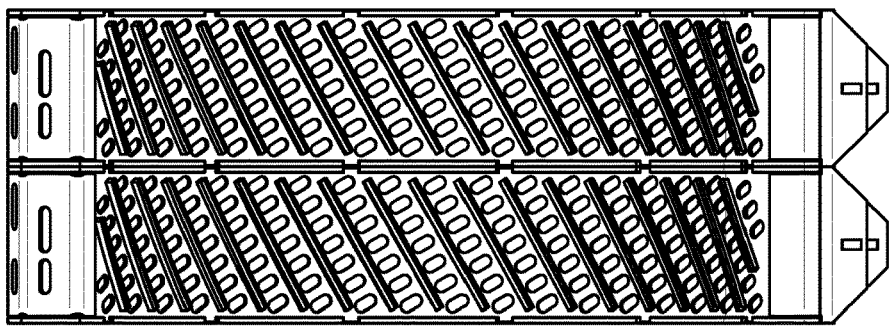
FIG. 29 is a front view of the concave assembly of FIG. 8.
Figure 28:
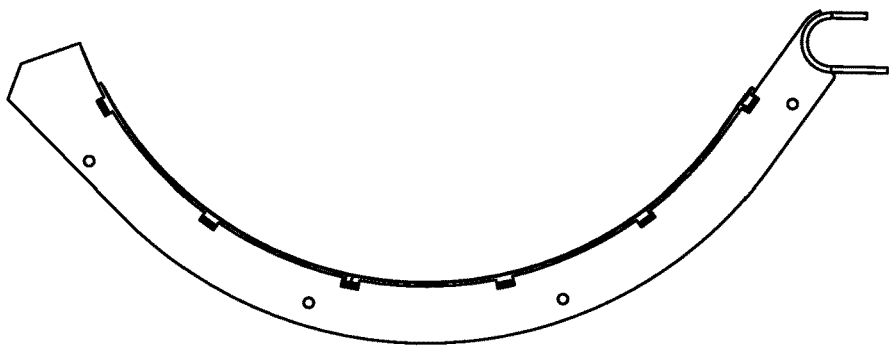
FIG. 28 is a left side view of the concave of FIG. 8.
Figure 27:
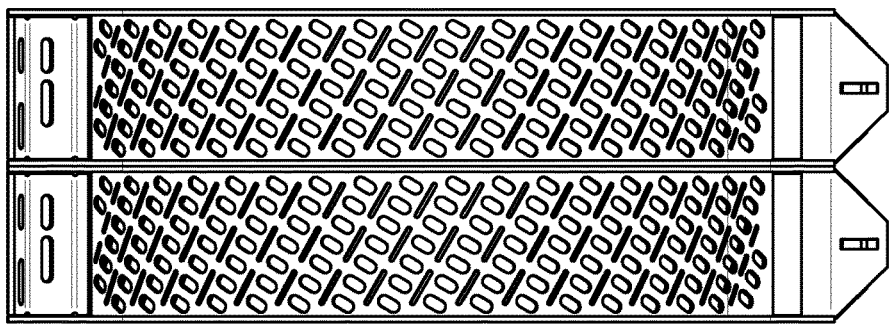
FIG. 27 is a rear view of the concave assembly of FIG. 8.
Figure 31:
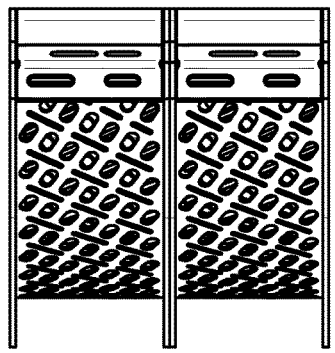
FIG. 31 is a top view of the concave assembly of FIG. 8.
Figure 32:
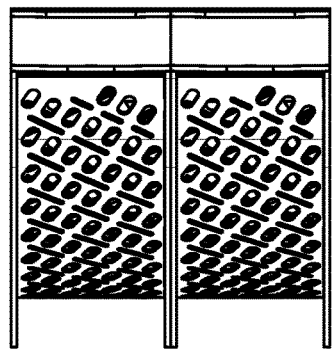
FIG. 32 is a bottom view of the concave assembly of FIG. 8.
Figure 36:
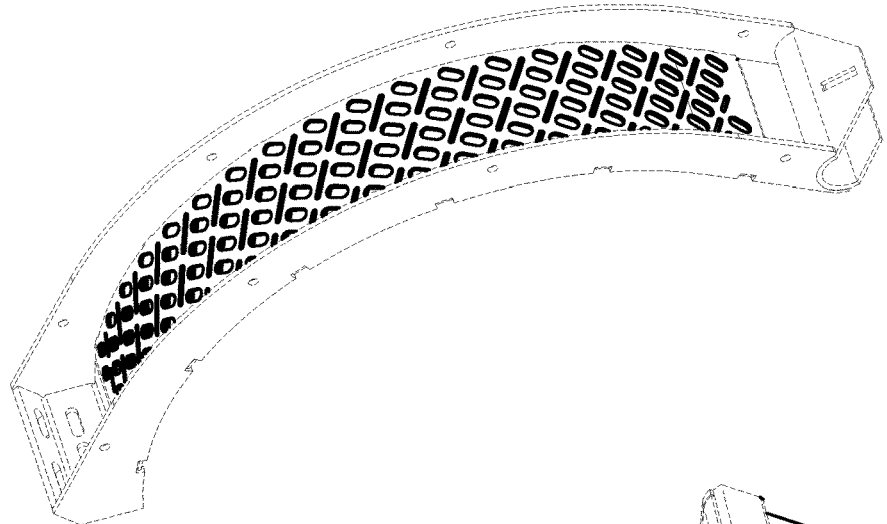
FIG. 36 is the concave section of FIG. 15 with portions shown in broken lines showing concave mounting structure for mounting in a harvester that may vary from manufacturer to manufacturer and therefore can be considered as forming no part the design embodiment depicted.
Figure 35:
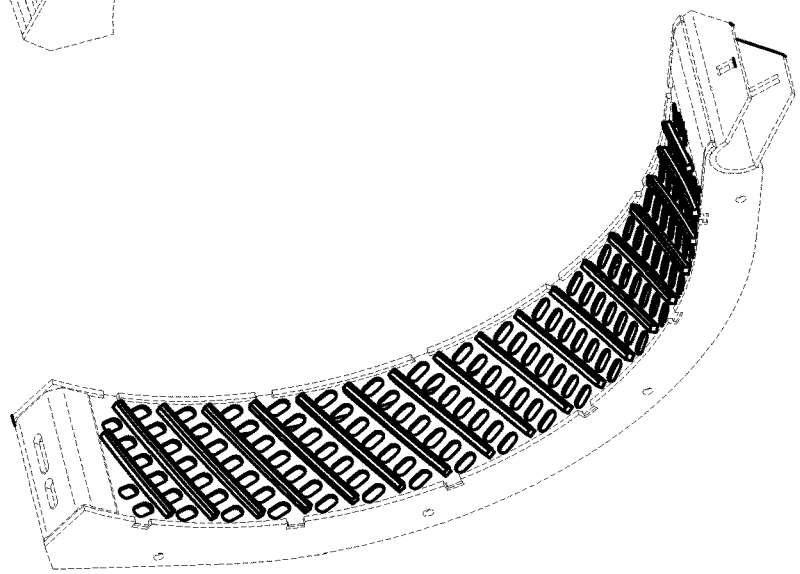
FIG. 35 is the concave section of FIG. 14 with portions shown in broken lines showing concave mounting structure for mounting in a harvester that may vary from manufacturer to manufacturer and therefore can be considered as forming no part the design embodiment depicted.
Figure 34:
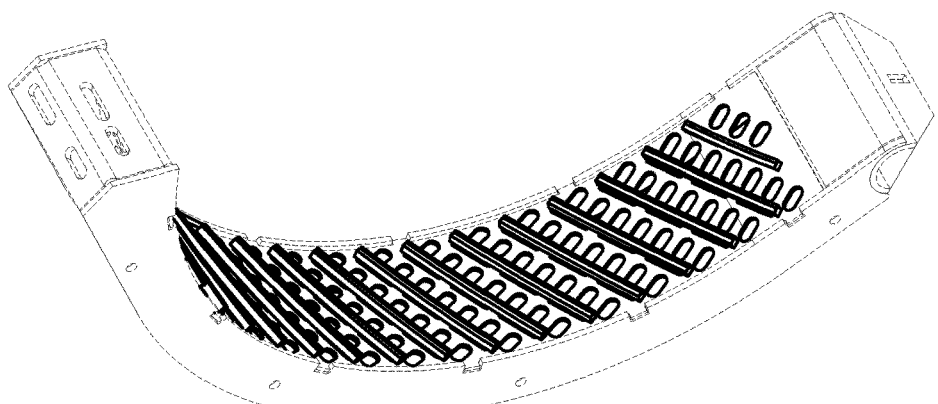
FIG. 34 is the concave section of FIG. 13 with portions shown in broken lines showing concave mounting structure for mounting in a harvester that may vary from manufacturer to manufacturer and therefore can be considered as forming no part the design embodiment depicted.
Figure 40:
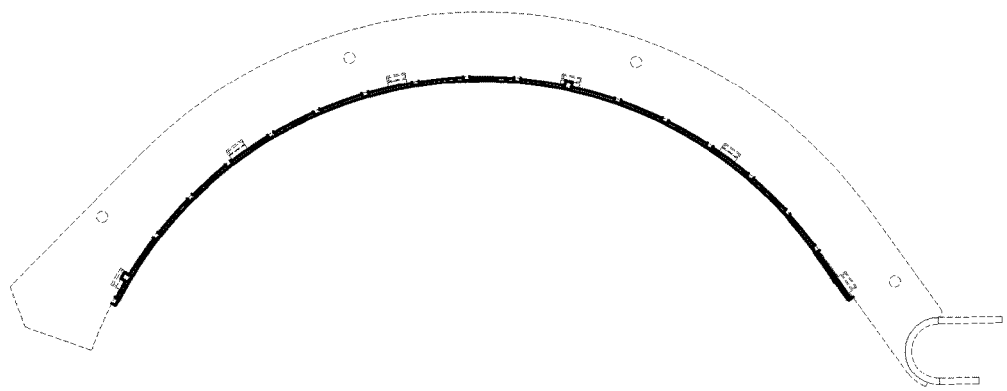
FIG. 40 is the concave section of FIG. 19 with portions shown in broken lines showing concave mounting structure for mounting in a harvester that may vary from manufacturer to manufacturer and therefore can be considered as forming no part the design embodiment depicted.
Figure 39:
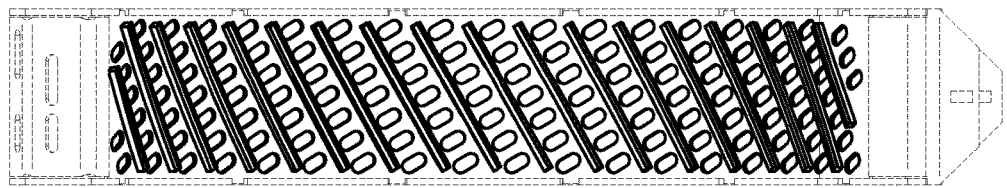
FIG. 39 is the concave section of FIG. 18 with portions shown in broken lines showing concave mounting structure for mounting in a harvester that may vary from manufacturer to manufacturer and therefore can be considered as forming no part the design embodiment depicted.
Figure 38:
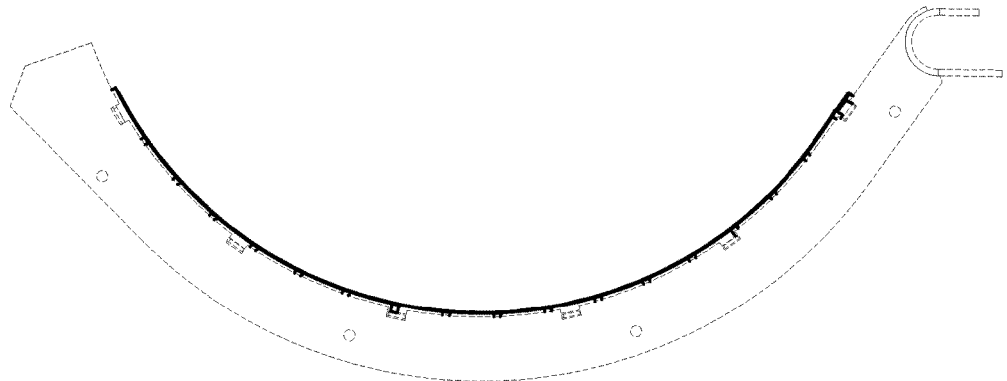
FIG. 38 is the concave section of FIG. 17 with portions shown in broken lines showing concave mounting structure for mounting in a harvester that may vary from manufacturer to manufacturer and therefore can be considered as forming no part the design embodiment depicted.
Figure 37:
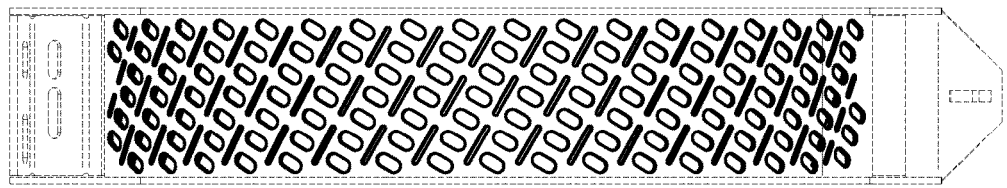
FIG. 37 is the concave section of FIG. 16 with portions shown in broken lines showing concave mounting structure for mounting in a harvester that may vary from manufacturer to manufacturer and therefore can be considered as forming no part the design embodiment depicted.
Figure 41:
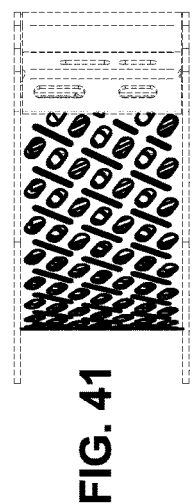
FIG. 41 is the concave section of FIG. 20 with portions shown in broken lines showing concave mounting structure for mounting in a harvester that may vary from manufacturer to manufacturer and therefore can be considered as forming no part the design embodiment depicted.
Figure 42:
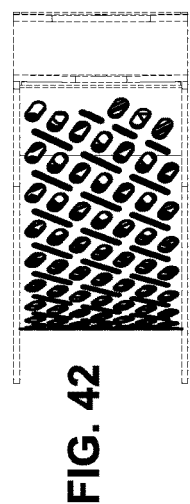
FIG. 42 is the concave section of FIG. 21 with portions shown in broken lines showing concave mounting structure for mounting in a harvester that may vary from manufacturer to manufacturer and therefore can be considered as forming no part the design embodiment depicted.

FIG. 12 illustrates yet another configuration for a rotator cage section based on the advantageous ability to configure individual concave sections with varying thresher and separator profiles. Here roto cage section 1400 is illustrated with half its concave sections with threshing profiles 1081 that extend from a leading end 1456 to a trailing end 1460 of the rotator cage section 1400. Specifically, the threshing profiles 1081 are found on concave sections 1128, 1130, and 1228. Meanwhile, concave sections 1230, 1328 and 1330 have separation profiles 1082 that extend from leading end 1456 to trailing end 1460 of the rotator cage section 1400. Of particular note is that the concave assembly 1200 includes one concave section 1228 with the threshing profile 1081 while its joined second concave section 1230 has threshing profile 1082. Accordingly, rotator cage section 1400 demonstrates the advantage provided by embodiments of the instant application wherein individual concave sections are configured with threshing and separating profiles to minimize rotor loss and grain damage.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A concave section for a harvester comprising:
   a first concave body comprising:
      a first leading end;
      a first trailing end;
      a first upstream side;
      a first downstream side, wherein a width between the first upstream side and the first downstream side is no greater than 10 inches;
      a first crop engagement face extending between the first ends and the first sides;
   wherein the first crop engagement face comprises at least one of a first thresher profile portion and a first separator profile portion;
   wherein the concave section comprises a combination profile including the first thresher profile portion and the first separator profile portions, which are of differing profiles, the first thresher profile portion being arranged at the first leading end, the first separator profile portion being arranged at the first trailing end with a configuration such that when mounted in the harvester, the first thresher profile portion is adapted to engage a flow of crop material prior to the first separator profile portion.

2. The concave section of claim 1, wherein the width is less than 8 inches.

3. The concave section of claim 1, wherein the width is between 6 and 8 inches.

4. The concave section of claim 1, wherein the concave section has a weight of less than 50 pounds.

5. The concave section of claim 1, wherein the concave section has a weight of between 30 and 50 pounds.

6. A concave assembly comprising the concave section of claim 1, and further comprising a second concave section, the second concave section comprising: a second concave body with a second leading end, a second trailing end, a second upstream side, a second downstream side, wherein a width between the second upstream side and the second downstream side is no greater than 10 inches; and second crop engagement face extending between the second ends and the second sides; wherein the second crop engagement face is differently configured than the first crop engagement face, and wherein the first downstream side is adjacent the second upstream side.

7. The concave assembly of claim 1, wherein said concave section comprises only the first thresher profile portion, and wherein the second concave section comprises the first separator profile portion, the first separator profile portion being of differing profile than the first thresher profile portion.

8. The concave section of claim 1, wherein a first concave body length is defined between the first leading end and the first trailing end and the first thresher profile portion extends from the first leading end to an intersection with the first separator profile portion at least ¼ and ½ of the total distance.

9. The concave section of claim 1, wherein the concave section includes the first thresher profile portion, which comprises:
   a radius plate extending between the first sides;
   upstanding rectangular rub bars mounted on the radius plate and extending transversely between the sides and in rows extending from the first leading end toward the first trailing end;
   open slots defined by the radius plate extending between the first sides and extending in aperture rows between the upstanding rectangular rub bars from the first leading end toward the first trailing end.

10. The concave section of claim 9, wherein the upstanding rectangular rub bars extend greater than 75% of a width between the first upstream side and the first downstream side.

11. The concave section of claim 1, wherein the concave section includes the first separator profile portion, which comprises:
   separator bars defining smooth arcuate engaging surfaces facing towards a central rotor cavity defined by the first concave body, each one of the separator bars has a longitudinal axis extending transversely between the first sides; and
   wherein the separator bars are spaced between ¾ and ¾ inches apart to define separator apertures therebetween.

12. The concave section of claim 1, wherein the first concave body extends around a central rotor axis and defines a rotor cavity:
   the first thresher profile portion when employed comprising upstanding rectangular rub bars having threshing surfaces defining a corner facing the rotor cavity, the upstanding rectangular rub bars being arranged in spaced apart relation; and
   the first separator profile portion when employed comprising separator bars that define a separator surface that is a smooth arcuate surface facing the rotor cavity, the separator bars being arranged in spaced apart relation.

13. The concave section of claim 12, wherein the first upstream side includes a first upstream sideplate extending perpendicular to the central rotor axis, the first downstream side includes a first downstream sideplate extending perpendicular to the central rotor axis and arranged parallel to the first upstream sideplate, the first leading end includes a first leading end plate assembly coupling the first upstream sideplate and the first downstream sideplate at the first leading end, the first trailing end includes a first trailing end plate assembly coupling the first upstream sideplate and the first downstream sideplate at the first trailing end, wherein the separator bars are directly coupled to the first upstream and downstream sideplates.

14. The concave section of claim 13, wherein the upstanding rectangular rub bars are indirectly coupled to the first upstream and first downstream sideplates via a radius plate, the upstanding rectangular rub bars mounted on the radius plate and extending transversely between the first upstream and first downstream sideplates at an angle of between 0 and 60 degrees relative to the central rotor axis, and further comprising open slots defined by the radius plate and between adjacent members of the upstanding rectangular rub bars, the open slots each having an area of between 10 and 40 square inches and occupying between 7 and 60% of an area of the radius plate.

15. The concave section of claim 13, wherein the separator bars extend a full width between the first upstream and first downstream sideplates, and wherein the upstanding rectangular rub bars extend a partial width that is between 50 and 100% of a full width between the first upstream and first downstream sideplates.

16. A harvester including the concave section of claim 1, the harvester including a vehicle having a bin;
   a head at a front of the vehicle for engaging a crop to remove crop material;
   a rotor interposed between the bin and the head, the rotor proximate the concave section in a concave region, the rotor having a spiral engaging element facing the concave section operable to impart a rotational spiral flow of crop material against the first concave body, wherein the concave region is adjacent a separator region, and wherein more 3 concave sections are arranged in the concave region of the harvester.

17. The harvester of claim 16, wherein at least 6 concave sections are arranged in the concave region of the harvester, and wherein additional separator sections are disposed in the separator region.

18. The harvester of claim 16, wherein at least one full thresh concave section is provided at an upstream location of the concave region, the full thresh concave section comprising only the first thresher profile portion.

19. The harvester of claim 16, wherein each of the concave sections comprises no combination profiles, but only one of the first thresher profile portion or the second separator profile portion, or other third thresher profile portion.

20. The harvester of claim 19, wherein at least 6 concave sections are provided, including at least one first concave section having threshing upstanding rectangular rub bars, a second concave section comprising annular separators at a first inclination orientation; and a third concave section comprising annular separators at a second inclination different from and less aggressive than the first inclination orientation.

21. A concave assembly for a harvester comprising:
   a first concave section comprising:
      a first upstream side;
      a first downstream side; and
      a first crop engagement face located between the first sides,
   a second concave section comprising:
      a second upstream side; and
      a second downstream side; and
      a second crop engagement face located between the second sides,
   wherein the first and second concave sections are removably connected along the first downstream side and the second upstream side to form the concave assembly having a combined width of not greater than 20 inches; and
   wherein the first crop engagement face has a first thresher profile portion and a first separator profile portion, and the second crop engagement face has a second thresher profile portion and a second separator profile portion.

22. The concave assembly of claim 21, wherein the first and second thresher profile portions are the same relative to each other and wherein the first and second separator profile portions are the same relative to each other and different relative to the thresher profile portions.

23. The concave assembly of claim 22, wherein the first thresher profile portion and the second thresher profile portion are different relative to each other and relative to the separator profile portions.

24. The concave assembly of claim 21, wherein the concave assembly comprises a leading end and a trailing end and extends a total length between the ends of between 20 and 60 inches wherein the concave assembly defines a total assembly width between 8 and 20 inches and extending between the upstream face of the first concave section and the downstream face of the second concave section, the first concave section and second concave section having equal widths.

* * * * *